US010333965B2

(12) United States Patent
Gathala et al.

(10) Patent No.: US 10,333,965 B2
(45) Date of Patent: Jun. 25, 2019

(54) METHODS AND SYSTEMS FOR ON-DEVICE REAL-TIME ADAPTIVE SECURITY BASED ON EXTERNAL THREAT INTELLIGENCE INPUTS

(71) Applicant: QUALCOMM Incorporated, San Diego, CA (US)

(72) Inventors: Sudha Anil Kumar Gathala, Tracy, CA (US); Saumitra Mohan Das, San Jose, CA (US); Nayeem Islam, Palo Alto, CA (US); Dallas James Wiener, San Diego, CA (US); Hugo Romero, San Diego, CA (US); Harold Gilkey, San Diego, CA (US); Giridhar Mandyam, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 130 days.

(21) Appl. No.: 15/262,858

(22) Filed: Sep. 12, 2016

(65) Prior Publication Data

US 2018/0077195 A1    Mar. 15, 2018

(51) Int. Cl.
*H04L 29/06*    (2006.01)
*G06F 21/53*    (2013.01)
*G06F 21/57*    (2013.01)

(52) U.S. Cl.
CPC .......... *H04L 63/1441* (2013.01); *G06F 21/53* (2013.01); *G06F 21/577* (2013.01);
(Continued)

(58) Field of Classification Search
CPC ............ H04L 63/20; H04L 63/1416; H04L 63/1433; H04L 63/1441; G06F 21/564
(Continued)

(56) References Cited

U.S. PATENT DOCUMENTS 8,671,449 B1    3/2014  Nachenberg
8,904,520 B1    12/2014 Nachenberg et al.
(Continued)

FOREIGN PATENT DOCUMENTS

CN    102739649 A    10/2012
WO    2007075850 A2   7/2007
WO    2011019720 A1   2/2011

OTHER PUBLICATIONS

Altekar, Gautam, et al. "OPUS: Online Patches and Updates for Security." USENIX Security Symposium. 2005. (Year: 2005).*
(Continued)

*Primary Examiner* — Syed A Zaidi
(74) *Attorney, Agent, or Firm* — The Marbury Law Group, PLLC

(57) ABSTRACT

Methods, and computing devices implementing the methods, that enable client computing devises to work in conjunction with a server device to identify and temporarily defend against non-benign applications (e.g., malware, etc.) and other threats before a more permanent solution or defense (e.g., a patch or software upgrade) becomes available and installed on the client computing device. The server device may be configured to receive reports from the client computing devices, receive threat feeds from third-party servers (e.g., threat intelligence servers, etc.), and use information included in the received threat feed and information included in the received reports to analyze, in the server computing device, a software application that is operating on a client device in multiple passes. The server may generate threat scores (e.g., one for each pass, etc.), and the threat scores to the client computing device for use in devising a customized security response.

30 Claims, 14 Drawing Sheets

(52) U.S. Cl.
CPC .......... *H04L 63/1433* (2013.01); *H04L 63/20* (2013.01); *G06F 2221/2115* (2013.01); *G06F 2221/2139* (2013.01)

(58) Field of Classification Search
USPC .......................................................... 726/25
See application file for complete search history.

(56) References Cited

U.S. PATENT DOCUMENTS

| | | | |
|---|---|---|---|
| 9,043,922 B1* | 5/2015 | Dumitras | G06F 21/577 726/25 |
| 9,336,385 B1 | 5/2016 | Spencer et al. | |
| 2006/0080656 A1* | 4/2006 | Cain | G06F 8/65 717/174 |
| 2006/0161979 A1 | 7/2006 | Pandey et al. | |
| 2007/0143851 A1* | 6/2007 | Nicodemus | G06F 21/55 726/25 |
| 2008/0052383 A1 | 2/2008 | O'Shaughnessy et al. | |
| 2008/0178168 A1* | 7/2008 | Sriram | G06F 11/0736 717/169 |
| 2008/0178287 A1* | 7/2008 | Akulavenkatavara | G06F 11/3644 726/22 |
| 2011/0040825 A1 | 2/2011 | Ramzan et al. | |
| 2011/0047597 A1 | 2/2011 | Mahaffey et al. | |
| 2011/0119106 A1 | 5/2011 | Dahl et al. | |
| 2011/0119765 A1 | 5/2011 | Hering et al. | |
| 2012/0117650 A1 | 5/2012 | Nachenberg | |
| 2013/0318614 A1 | 11/2013 | Archer et al. | |
| 2014/0201806 A1 | 7/2014 | Kumar | |
| 2018/0077188 A1 | 3/2018 | Mandyam et al. | |

OTHER PUBLICATIONS

International Search Report and Written Opinion—PCT/US2017/050207—ISA/EPO—dated Nov. 23, 2017.

Chen P., et al., "CloudER: A Framework for Automatic Software Vulnerability Location and Patching in the Cloud", Proceedings of the 7th ACM Symposium on Information, Computer and Communications Security, May 2012, pp. 50-55.

Jin G., et al., "Automated Atomicity-Violation Fixing", Proceedings of the 32nd ACM SIGPLAN Conference on Programming Language Design and Implementation, vol. 46, Issue 6, Jun. 2011, pp. 389-400.

Lin Z., et al. "AutoPaG: Towards Automated Software Patch Generation with Source Code Root Cause Identification and Repair", CERIAS and Department of Computer Science Purdue University, USA, Mar. 2007, pp. 1-12.

Zhang M., et al., "AppSealer: Automatic Generation of Vulnerability-Specific Patches for Preventing Component Hijacking Attacks in Android Applications", Department of EECS Syracuse University, Feb. 22, 2014, pp. 1-15.

* cited by examiner

METHODS AND SYSTEMS FOR ON-DEVICE REAL-TIME ADAPTIVE SECURITY BASED ON EXTERNAL THREAT INTELLIGENCE INPUTS

BACKGROUND

Cellular and wireless communication technologies have seen explosive growth over the past several years. This growth has been fueled by better communications, hardware, larger networks, and more reliable protocols. As a result, wireless service providers are now able to offer their customers with unprecedented levels of access to information, resources, and communications. To keep pace with these service enhancements, client computing devices (e.g., mobile electronic devices, cellular phones, tablets, laptops, etc.) have become more powerful and complex than ever. This complexity has created new opportunities for malicious software, software conflicts, hardware faults, and other similar errors or phenomena to negatively impact an electronic device's long-term and continued performance and power utilization levels. This complexity has also afforded hackers and thieves seemingly endless opportunities to discover and exploit new vulnerabilities in the client computing devices. Accordingly, new and improved security solutions that better protect client computing devices, such as mobile and wireless devices, from non-benign applications (e.g., malware, etc.) and other threats will be beneficial to consumers.

SUMMARY

The various embodiments include methods of protecting a client computing device, which may include receiving threat profile information from a server computing device (the received threat profile information identifying a new threat and at least one characteristic of the new threat), using the received profile information and information collected in the client computing device to locally devise a customized security response to the new threat in response to determining that the client computing device is vulnerable to the new threat, and installing the customized security response to protect the client computing device from the new threat before a security patch or software update is available.

In some embodiments, the methods may include using the received profile information and information collected in the client computing device to determine whether the client computing device is vulnerable to the new threat, and the operation of using the received profile information and information collected in the client computing device to locally devise the customized security response to the new threat may be performed in response to determining that the client computing device is vulnerable to the new threat.

In some embodiments, the methods may include identifying a specific component (or specific components, specific combination of components, etc.) in the client computing device that is vulnerable to the new threat, and using the received profile information and information collected in the client computing device to locally devise the customized security response may include devising the customized security response based on the specific component(s) determined to be vulnerable to the new threat. In some embodiments, the methods may include determining a vulnerability level of the client computing device based on the received profile information, and using the received profile information and information collected in the client computing device to locally devise the customized security response to the new threat may include devising the customized security response based on the determined vulnerability level.

In some embodiments, the methods may include determining whether the security patch or software update is available, and uninstalling the customized security response in response to determining that the security patch or software update is available. In some embodiments, receiving threat profile information from the server computing device may include polling the server computing device for threat profile information, and receiving the threat profile information from the server computing device in response to the polling. In some embodiments, the methods may include analyzing a behavior of the client computing device, generating a report based on results of analyzing the behavior, and sending the generated report to the server computing device.

In some embodiments, the methods may include receiving in the server computing device a plurality of reports, identify the new threat based on a result of analyzing the received reports, analyzing the new threat to determine characteristics of the new threat and generate a threat profile, and sending the generated threat profile to the client computing device. In some embodiments, the method may include determining in the server computing device whether the client computing device is vulnerable to the new threat, in which sending the generated threat profile to the client computing device includes sending the generated threat profile to the client computing device in response to determining that the client computing device is vulnerable to the new threat.

Further embodiments may include a computing device that includes various means for accomplishing the functions of the methods summarized above. Further embodiments may include a client computing device that includes a processor configured with processor-executable instructions to perform operations of the methods summarized above. Further embodiments may include a non-transitory computer readable storage medium having stored thereon processor-executable software instructions configured to cause a processor of a client computing device to perform operations of the methods summarized above.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

Figure 1:
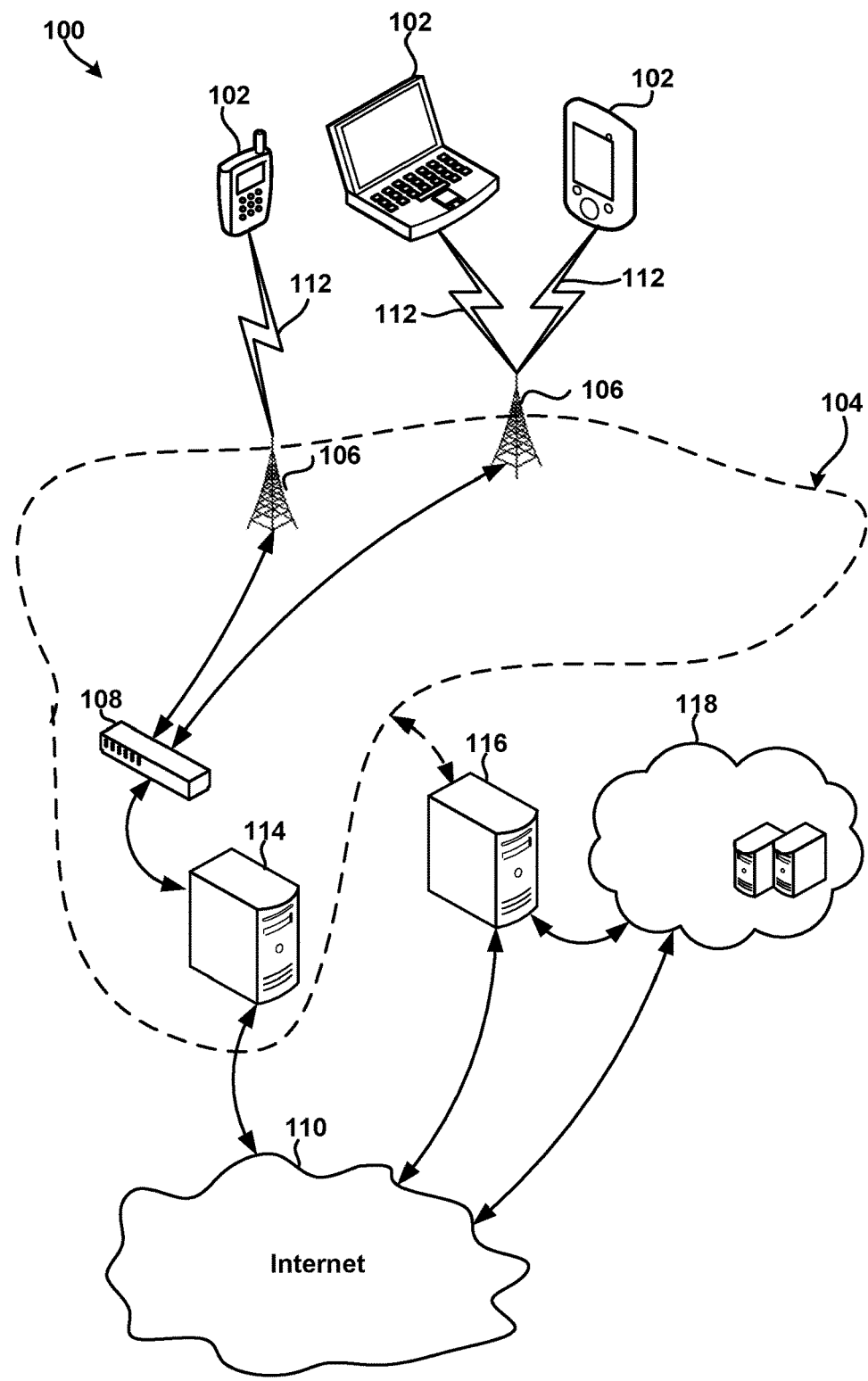
FIG. 1 is a communication system block diagram illustrating network components of an example telecommunication system that is suitable for use in implementing various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

In overview, the various embodiments include methods, and computing devices (e.g., server computing devices, mobile or resource-constrained computing devices, etc.) configured to implement the methods, for responding to potentially non-benign applications (e.g., malware, etc.) and other threats that could have a negative impact on the performance of a client computing device before more robust protections (e.g., upgraded security software, etc.) or permanent solutions (e.g., a software update, patch, etc.) become available. Various embodiments enable a client computing device to work in conjunction with a server computing device to quickly learn about the existence and characteristics of new and emerging threats. Various embodiments allow the client computing device to temporarily implement customized security measures to better protect the client device from the identified threat(s) before more permanent solutions or protections become available and installed on the client device.

The server computing device may be deployed in the cloud (or included in a cloud network, etc.) and configured to receive reports from a plurality of client computing devices and/or from other security servers (e.g., antivirus servers, crowd sourcing server, etc.). The server computing device may use the received reports to analyze various conditions, events or behaviors in order to identify new and emerging threats (e.g., a new and potentially non-benign application, etc.). The server computing device may analyze an identified threat, determine the characteristics of the threat, generate an intelligence report or threat-profile that identifies the existence and characteristics of identified threats (and well as other threat-related information), and send the generated threat-profile to all or a subset of the client computing devices.

The client computing devices may include various on-device security systems, including an on-device real-time adaptive security component. A client computing device may be configured to receive a threat-profile from the server computing device, and use the information included in the threat-profile to implement a customized security response. For example, the client computing device may use the information included in the threat-profile (e.g., the characteristics of the identified threat, threat scores, etc.) to determine or identify specific characteristics of the identified threat, specific device components (e.g., modem, memory buffer, system bus, etc.) that are vulnerable to the identified threat, the level or degree to which the client device is vulnerable or susceptible to the identified threat, and/or a combination of the client device's existing local defense or security measures that could be used to protect itself against the identified threat. The client device may use any or all such information to intelligently devise a customized security response (e.g., an exploit-profile-specific response, etc.) that accounts for the specific characteristics of the identified threat, the security measures available on the device, the degree or level of the device's vulnerability to the identified threat, the specific components that are vulnerable to the identified threat, or other similar factors or conditions.

For example, the client computing device may intelligently devise a customized security response that includes activating, increasing or otherwise adjusting all or a select subset of the identified security measures (i.e., existing defense or security measures in the client device that are determined to be effective for protecting the device against the identified threat). The client computing device may also devise a customized security response that includes adjusting the amount of the device's processing or battery resources that are used for providing security on the device, tailoring or focusing the operations of on-device security systems to detect specific activities that are associated with threat, increasing the level of protection or scrutiny provided by the on-device security systems based on the level or degree to which the client device is vulnerable or susceptible to the identified threat, etc. The client device may implement and use the customized security response until the threat is neutralized or until a better or more permanent solution (e.g., patch, software update, etc.) becomes available.

In some embodiments, the server computing device may be configured to generate and send one or more threat scores to the client computing device (or to a corporate or enterprise security manager component/server, etc.). The server computing device may include the one or more threat scores in an intelligence report/threat-profile, or generate and send one or more threat scores to the client devices independent of the threat-profiles or intelligence reports.

As an example, a client computing device may download a software application (or software application package), install the software on the device, and send application-related information (e.g., the download server, the downloaded software package, etc.) to the server computing device. The server computing device (or a mobile threat intelligence component in the server computing device, etc.) may ingest information (e.g., daily threat feeds, etc.) from third-party or cloud services, and use the ingested information to analyze the received application-related information in multiple ways, in multiple passes, for different kinds of threats, using multiple analysis techniques, using multiple different types of software engines, etc. The server may use the results generated by these analyses to generate one or more threat scores (e.g., a threat score for each type of analysis, for each pass, etc.), and send the generated one or more threat scores to the client computing device.

The client computing device may receive and use the one or more threat scores to intelligently devise and implement a response that is commensurate with the determine threat level. For example, the client computing device may use the received one or more threat scores to determine whether the risks associated with running a software application (or engaging in an activity/behavior, etc.) exceed its benefits, and terminate or quarantine the software application in response to determining that the risks exceed the benefits. The client computing device may also use the receive one or more threat scores to determine the specific device components that are vulnerable to attack, determine the level or degree to which existing defense or security measures could be effective against an identified threat, determine the local defense or security measures that should be activated on the device, determine the level or degree of scrutiny that should be applied by local on-device security systems, etc.

For example, the client computing device may receive one or more threat scores that indicate that there is a moderately high probability that running a gaming app will result in adware being installed on the device, and a very low probability that the gaming app will install a virus, worm, spyware or ransomware. Based on this information, the client device may determine that the risks associated with running the gaming app are acceptable (i.e., the benefits to the user exceed the risks), and allow the software application to continue operating on the device.

As another example, the received one or more threat scores may indicate that two out of ten independent security systems (e.g., third-party servers, etc.) determined that an activity associated with a software application is suspicious or potentially non-benign. In response, the client device may determine that the software application is a banking app that has access to highly sensitive information, and determine that the risks associated with running the banking app are not acceptable. In response, the client device may terminate the application or implement another suitable response that is commensurate with the determined level of risk. Alternatively, the client device may determine that the software application is a gaming app that does not have access to sensitive information, and allow the application to continue operating on the device (i.e., because only two out of ten security systems identified the activity as being potentially non-benign, etc.).

The various embodiments improve the functioning of the client computing device by improving the device's security, performance, and power consumption characteristics. For example, by using a threat profile and/or threat scores to rapidly devise and temporarily implement a customized threat-specific security response, the various embodiments improve the device's security and protect the device from experiencing degradation in performance over time. In addition, the various embodiments improve the device's performance and power consumption characteristics by allowing the computing device to intelligently balance tradeoffs between the amount of the device's (often limited) processing, memory, or energy resources that are used to respond to an identified threat and the severity of the risk posed by that threat. Additional improvements to the functions, functionalities, and/or functioning of computing devices will be evident from the detailed descriptions of the embodiments provided below.

The terms "mobile computing device" and "client device" are used interchangeably herein to refer to any one or all of cellular telephones, smartphones, personal or mobile multimedia players, personal data assistants (PDA's), laptop computers, tablet computers, smartbooks, ultrabooks, palmtop computers, wireless electronic mail receivers, multimedia Internet enabled cellular telephones, wireless gaming controllers, and similar personal electronic devices which include a memory, a programmable processor for which performance is important, and operate under battery power such that power conservation methods are of benefit. While the various embodiments are particularly useful for mobile computing devices, such as smartphones, which have limited resources and run on battery, the embodiments are generally useful in any electronic device that includes a processor and executes application programs.

Phrases such as "performance degradation," "degradation in performance" and the like may be used in this application to refer to a wide variety of undesirable operations and characteristics of a network or computing device, such as longer processing times, slower real time responsiveness, lower battery life, loss of private data, malicious economic activity (e.g., sending unauthorized premium short message service (SMS) message), denial of service (DoS), poorly written or designed software applications, malicious software, malware, adware, viruses, key loggers, ransomware, phishing, spyware, mRATs Trojans, SMS Fraudware, rootkits, attack vectors, fragmented memory, operations relating to commandeering the device or utilizing the device for spying or botnet activities, etc. Also, behaviors, activities, and conditions that degrade performance for any of these reasons are referred to herein as "not benign" or "non-benign."

Hackers and thieves are skilled at identifying new weaknesses and vulnerabilities in computing devices, and exploiting these vulnerabilities for nefarious activities (e.g., stealing financial data, installing malware, etc.). Conventional security solutions attempt to address this problem by periodically generating and sending software patches or updates to the client computing devices. However, these solutions do not adequately protect the computing devices from the non-benign application, performance degradation, hackers, etc.

There are a number of reasons why existing and conventional solutions do not adequately protect computing devices. A significant amount of time and effort is required identify a vulnerability and/or generate a software update or a security patch that is suitable for use by a sufficiently large number of devices. For example, it commonly takes between 60-350 days to create and deploy patches for the open-source components in Android-based devices. As a result, conventional solutions do not create and distribute software patches frequently enough to stay ahead of the hackers, thieves, and malware designers that exploit such vulnerabilities.

Further, installing software updates or security patches could create new problems, vulnerabilities or incompatibilities on the client computing device. As a result, the updates or patches (particularly for background processes, open source components, etc.) may not always be automatically distributed and installed on the client computing devices. More often, it is the responsibility of the user to update the computing device and/or install patches. Yet, due to the frequency in which patches are distributed, the number of systems that could require updating with each patch, and the time required to install each update or patch, many users simply choose not to install patches or updates. For these and other reasons, client computing devices could remain vulnerable to cyber-attacks and other nefarious activities of hackers and thieves even though the threats have been identified by organizations that look for such threats (e.g., security software vendors).

In order to overcome the limitations of existing and conventional solutions, the various embodiments include client computing devices that are configured to work in conjunction with a server computing device to quickly, automatically, efficiently, and intelligently identify and respond to emerging threats (e.g., a new and potentially non-benign software application, etc.).

Client computing devices may be equipped with an on-device security system that is configured to scan application software for known security risks and repeatedly (or near-continuously) monitor and analyze various conditions and device behaviors to identify non-benign software applications, exploits, attack vectors, etc. An exploit is a software routine written to take advantage of a vulnerability (or flaw, bug, weakness, etc.) in a computer system, typically for unauthorized purposes, such as installing a non-benign application or stealing financial information. An attack vector is a tool, structure, or path by which a hacker can gain unauthorized access to a computer or network server, typically to deliver an unauthorized payload or install a non-benign application.

As part of the operations for identifying and responding to these and other non-benign conditions (exploits, attack vectors, etc.), the on-device security system may collect detailed behavior information or generate detailed analysis information. The client computing devices may be configured to collect and use this information to generate detailed reports, and send the generated reports to the server computing device. For example, a client computing device may use a lightweight or background process (or threads, daemons, etc.) to collect the information that is used for the reports, and send the reports periodically and/or in response to select conditions or events (e.g., in response to detecting a non-benign device behavior, etc.). Using a lightweight or background process to intelligently collect and report information on select conditions allows the client computing device to better balance tradeoffs between security, performance, and power efficiency.

The server computing device may be configured to receive reports from client computing devices and security servers. The server computing device may analyze the information included in the received reports in order to identify new and emerging threats. The server computing device may stress test, evaluate or otherwise analyze the identified threats in order determine the characteristics of each of the identified threats. The server computing device may use any or all of a variety of available analysis techniques to identify the threats, determine their characteristics, or generate one or more threat scores. Examples of analysis techniques that could be used by the server computing device include static analysis, dynamic analysis, behavior-based analysis, machine learning, simulation, emulation, data-flow analysis, heuristics, and speculation.

The server computing device may generate a threat-profile for each of the identified threats. A threat-profile may be an information structure that includes information (e.g., a series of numbers, values, characters, strings, etc.) that represents or characterizes a specific threat (e.g., a specific type of exploit, a specific attack vector, a specific non-benign behavior, etc.). In some embodiments, the threat-profile may also include information that is specific to a target client computing device or to a type of client computing device. For example, a threat-profile may include information that indicates a specific software application is a threat (e.g., is potentially malicious or non-benign, etc.), a list of non-benign activities performed by the software application, a list of vulnerabilities exploited by the software application in order to engage in non-benign activities, a list of features present in the target client computing device that could be exploited by the software application, and a list of defensive measures that could be implemented by the client device in order to restrict, prevent or protect against the non-benign activities of the software application.

In the various embodiments, the server computing device may be configured to generate the threat-profile to include information that identifies the nature of an identified vulnerability, potential attack vectors, newly discovered non-benign software applications, recently broken exploits, vulnerabilities in the client computing devices that exploited by the non-benign software applications, types of threats discovered, types of client devices that are vulnerable to a discovered threat, and/or vulnerabilities in a client device that could be exploited by a discovered threat.

In some embodiments, the server computing device may be configured to generate the threat-profile to include one or more threat scores. Each of the threat scores may be an information structure that includes a weight value and a threat assessment value. Each of these threat assessment values may be generated based on information received from a different third-party vendor, a different security system, a different pass through an analysis engine, a different level of detail used to evaluate the threat, etc. Each threat assessment value may identify a probability that a software application or behavior is non-benign. Each threat assessment value may also identify the probability that a software application or behavior is a specific type of non-benign behavior (e.g., is adware, is spyware, will be used to steal financial information, will have a significant negative impact on the responsiveness of the device, etc.).

In addition to a weight value and a threat assessment value, each "threat score" may include a score range, a range of possible scores, a range of values, a range of possible values, a criticality value, a confidence value, and information identifying a data type, meanings of values or scores, how each value/score should be measured, analyzed, weighted, used, etc.

In some embodiments, the server computing device may be configured to generate the threat-profile to include exploit information, such as exploit types or exploit behaviors (e.g., steps/operations used to by exploit, etc.).

In some embodiments, the server computing device may be configured to generate the threat-profile to include attack vector information. The attack vector information may include discovered attack vectors, attack vector names or IDs, attack vector locations or URLs, types of attack vectors that could be used to exploit the vulnerabilities in the client device, and other characteristics of the attack vectors that are relevant to the client device.

In some embodiments, the server computing device may be configured to generate the threat-profile to include geographic information. The geographic information may include a geo-exploit-heat-map that identifies geographical areas that are relevant to an identified threat, such as areas in which the client device is more likely to be susceptible to an identified threat, areas experiencing a high incidence of non-benign behaviors that associated with the identified threat, etc.

The threat-profile may also include information that identifies versions of installed software (e.g., operating system versions, release versions, etc.) that are vulnerable to the identified threat and/or versions of the installed software that are not vulnerable to the identified threat.

The threat-profile may also include information that identifies a secure workaround for avoiding, reducing or neutralizing the identified threat. The threat-profile may also include a Uniform Resource Identifier (URIs), Uniform Resource Locator (URL), web addresses or locations of reliable and secure servers that are suitable for downloading software updates or security patches that will help protect the device against the identified threat. The threat-profile may also include information that identifies a purpose or end goal of a discovered threat or exploit (e.g., obtaining a shell, leaking information, etc.), that may inform a behavior monitoring security system about types of behaviors to evaluate more closely.

In some embodiments, the server computing device may be configured to generate the threat-profile to also include threat impact information, reaction information, and/or actuation information. Threat impact information may identify the on-device libraries that are vulnerable (e.g., unpatched, etc.) to attack in view of a discovered threat, software applications or system-servers that are vulnerable (e.g., due to propagation analysis, etc.) to a discovered threat, potential privilege escalations, or other events or conditions relevant to a newly discovered threat that could negatively impact the client computing device due.

Actuation information may include information that may be used by the client computing device to better identify or determine the defense or security measures that are available in the client device and effective for responding to the discovered threat. The actuation information may also include information that may be used by the client computing device to better identify or determine the defense or security measures that could be activated, turned on, increased, scaled up, or otherwise adjusted in order to better defend the device against a discovered threat or exploit.

As an example, the server computing device may be configured to receive reports from a multitude of devices, and use behavior information included in the received reports to determine that a client computing device is engaged in activities that are non-benign. The server computing device may analyze the activities, determine the characteristics of the activities, and identify a vulnerability in the client computing device that was used or exploited by a hacker to install malware that caused the device to engage in the non-benign activities. The server computing device may also determine whether the same or a similar vulnerability exists in any of the other client computing devices. The server computing device may generate a threat-profile that identifies the malware and/or non-benign activates as a threat and/or includes important characteristics of the malware or non-benign activates. The server computing device may identify specific client devices that are vulnerable, at risk, or highly susceptible to the identified threats, and send the generated threat-profile to the identified client devices.

A client device may receive and use the threat-profile to determine that it is currently vulnerable to the identified threat, determine that the vulnerability is due to the version of operating system being used in the client device, determine that the non-benign activities could cause significant harm or damage, determine that an older version of the operating system available to the device is not vulnerable to the threat, that the older version of the operating system could be used to accomplish the client device's most important or critical activities, and automatically install the older version of the operating system on the client device. When a suitable software update or security patch becomes available, the client device may re-install a newer version of the operation system and resume its full activities.

As another example, the client device may include multiple versions of important libraries (e.g., a regular version and a pointer-authenticated version, multiple alternatives, etc.). The client device may determine that the regular version of an important library is vulnerable to a threat, and devise a customized security response that includes using the pointer-authenticated version of that library.

As yet another example, the client device may devise a customized security response that includes using an enhanced or time varying address space layout randomization (ASLR). The customized security response may also include using an enhanced stack protection technique (e.g., one that re-randomizes canaries based on threat-impacted UIDs, etc.), monitoring and/or analyzing a larger number of behavior features, adding or implementing more policies (e.g., SELINUX policies, etc.), disabling or restricting certain input vectors (e.g., disabling automatic processing of videos when an MMS is received), adding a dash board that shows the user the extent of vulnerable software present on the device and/or server locations for downloading patches and secure updates, modify OS permissions (e.g., Linux permissions, etc.) for certain files, etc. The customized security response may also include using a prioritized list of exploits. In some embodiments, the client device may determine the priorities based on an exploit-geo-heatmap included in the threat profile, and defend against the exploits based on their priorities (e.g., by allocating more resources to defend against high-priority exploits than lower priority exploits, protecting the device against high-priority exploits first, etc.).

A cloud-based scoring system in the server computing device may not be able to update the threat profile or threat scores immediately after receiving new information (e.g., a new anomaly report, etc.) from the client device. As such, there may be delays between the time that the server computing device receives information from a client device, the time that the server generates an updated threat profile or updated threat scores, and the time that the client receives the updated threat profile or updated threat scores from the server. During these periods, the client computing device may implement a local security response that is dependent on receiving updated information from the server. For example, the client device may detect a Transport Layer Security (TLS) connection with a self-signed certificate. In response, the client device may generate a report that identifies the destination IP address and certificate fingerprint (hash) associated with the detected connection, and send the report to the server computing device. The client device may queue all communication requests to the destination IP address for an offset period or until it receives updated threat scores from the server computing device. The server computing device may analyze the report, and send to client devices updated scores that indicate that the destination IP address is safe (or low risk). In response, the client computing device may unblock or release all connections to destination IP address from the queue.

Thus, in some embodiments, the client computing device may be configured to monitor device activities, determine that a monitored activity is suspicious, generate a report that identifies the suspicious activity, send the generated report to the server computing device, and install a preventive security response (e.g., queue all communication requests to the destination IP address, etc.) in the client device for an offset period. The client device may receive updated threat scores from the server computing device (e.g., scores that indicate that the destination IP address is safe), and uninstall the preventative security response.

In some embodiments, the server device may receive updated information from the client device (e.g., an updated report that includes a suspicious activity), and in response, instruct the client device to retrieve updated or modified threat scores after a time offset (i.e., after an offset period). The client device may implement a preventive security response until it receives updated scores or information from the server or until the time offset expires. The client device may also implement the preventive security response for the offset period and/or request updated information from the server computing device after the offset expires.

Many client computing devices enable their users to download and execute software applications from application download services (e.g., Apple® App Store, Windows® Store, Google® play, etc.) or the Internet. In addition, users commonly demand the capability to purchase goods, send and receive communications, pay bills, manage bank accounts and conduct other secure or sensitive transactions via such downloaded applications. To meet user demands for these features, operating systems now allow third party software applications to have access to many of the operating system's components and functions that have traditionally been restricted to a small number of trusted software applications or processes. Due to these trends, client devices have become more susceptible to cyber-attacks, and malware is increasingly being used by thieves and hackers to steal confidential or financial information.

To meet user demands for features and security, device manufacturers have developed various trusted execution environments (e.g., ARM TrustZone®, etc.) that aim to provide the device users with both an open, feature-rich, operating environment and robust security. These solutions establish a trusted execution zone in which a pre-authenticated software application is provided access to privileged or restricted features/operations of an operating system, such as the ability to modify system files, start or stop daemons, create or remove users/groups, or override the protections of the operating system.

In some embodiments, the client computing devices may be equipped with a secure computing environment or a trusted execution environment (e.g., ARM TrustZone®, etc.). In addition, the components, features, functions, or modules of the client computing device may be grouped, implemented, stored, or executed in different privilege or protection domains and/or in different portions of the secure or trusted computing environment. The client computing devices may be configured implement a customized security response across any or all of these privilege or protection domains. This allows client computing devices equipped with a secure computing environment or a trusted execution environment to identify all the relevant components or resources that could be used to protect the device against an identified threat and/or to more intelligently balance tradeoffs between security, performance, and power efficiency.

The various embodiments may be implemented within a variety of communication systems, such as the example communication system 100 illustrated in FIG. 1. A typical cell telephone network 104 includes a plurality of cell base stations 106 coupled to a network operations center 108, which operates to connect voice calls and data between client devices 102 (e.g., cell phones, laptops, tablets, etc.) and other network destinations, such as via telephone land lines (e.g., a POTS network, not shown) and the Internet 110. Communications between the client devices 102 and the telephone network 104 may be accomplished via two-way wireless communication links 112, such as 4G, 3G, CDMA, TDMA, LTE and/or other cell telephone communication technologies. The telephone network 104 may also include one or more servers 114 coupled to or within the network operations center 108 that provide a connection to the Internet 110.

The communication system 100 may further include network servers 116 connected to the telephone network 104 and to the Internet 110. The connection between the network servers 116 and the telephone network 104 may be through the Internet 110 or through a private network (as illustrated by the dashed arrows). A network server 116 may also be implemented as a server within the network infrastructure of a cloud service provider network 118. Communication between the network server 116 and the client devices 102 may be achieved through the telephone network 104, the Internet 110, private network (not illustrated), direct communication links, or any combination thereof.

The network server 116 may be configured to receive information on various conditions, features, behaviors, and corrective actions from a multitude of client devices 102 and/or a central database or cloud service provider network 118, and analyze this information to generate one or more threat scores and/or threat-profiles that may be used by a processor of a client computing device (e.g., client device 102, etc.) to devise and implement a customized security response. For example, the network server 116 may be configured to ingest information (e.g., daily threat feeds, etc.) from third-party or cloud services, and use the ingested information to analyze software-related information (received from the client device 102) in multiple ways, in multiple passes, for different kinds of threats, using multiple analysis techniques, using multiple different types of software engines, etc. The network server 116 may use the results generated by these analyses operations to generate one or more threat scores (e.g., a threat score for each type of analysis, for each pass, etc.), and send the generated one or more threat scores to the client computing device.

The client device 102 may include various defense or security measures, such as an on-device real-time adaptive security component, an on-device behavior-based monitoring and analysis system, a static analysis system, dynamic analysis system, a signature-based analysis system, an anti-virus scanner, etc. The client device 102 may include a processor that is configured to receive and use one or more threat scores and/or threat-profiles to identify a threat, determine the level or degree to which the client device 102 is vulnerable or susceptible to the identified threat, identify existing defense or security measures that could be used to protect against the identified threat, and devise/implement a customized security response (e.g., an exploit-profile-specific response, etc.) based on specific characteristics of the identified threat, the security measures available on the device, the degree or level of the device's vulnerability to the identified threat, and other similar factors. The processor in the client device 102 may also be configured to collect application-related information, generate detailed reports, and send the generated reports to the network server 116.

In some embodiments, the processor in the client device 102 may devise/implement the customized security response by selecting or activating a combination of the device's security features. For example, the processor may devise a customized security response by selecting a behavior observer component in the on-device behavior-based system to monitor communication circuitry of the device, an analysis component in the dynamic analysis system to analyze collected behavior information, and an actuation component in the static analysis system to restrict or limit select applications. As a further example, the processor in the client device 102 may devise/implement the customized security response by determining that the regular version of an important library is vulnerable to a threat, and devise the security response to include using a pointer-authenticated version of that library. The device processor may also devise the security response to include using an enhanced or time varying address space layout randomization (ASLR), using an enhanced stack protection technique (e.g., one that re-randomizes *canaries* based on threat-impacted UIDs, etc.), monitoring and/or analyzing a larger number of behavior features, adding or implementing more policies (e.g., SELINUX policies, etc.), disabling or restricting certain input vectors (e.g., do not automatically process videos when an MMS is received, etc.), adding a dash board that shows the user the extent of vulnerable software present on the device and/or server locations for downloading patches and secure updates, modify OS permissions (e.g., Linux permissions, etc.) for certain files, etc.

Figure 2A:
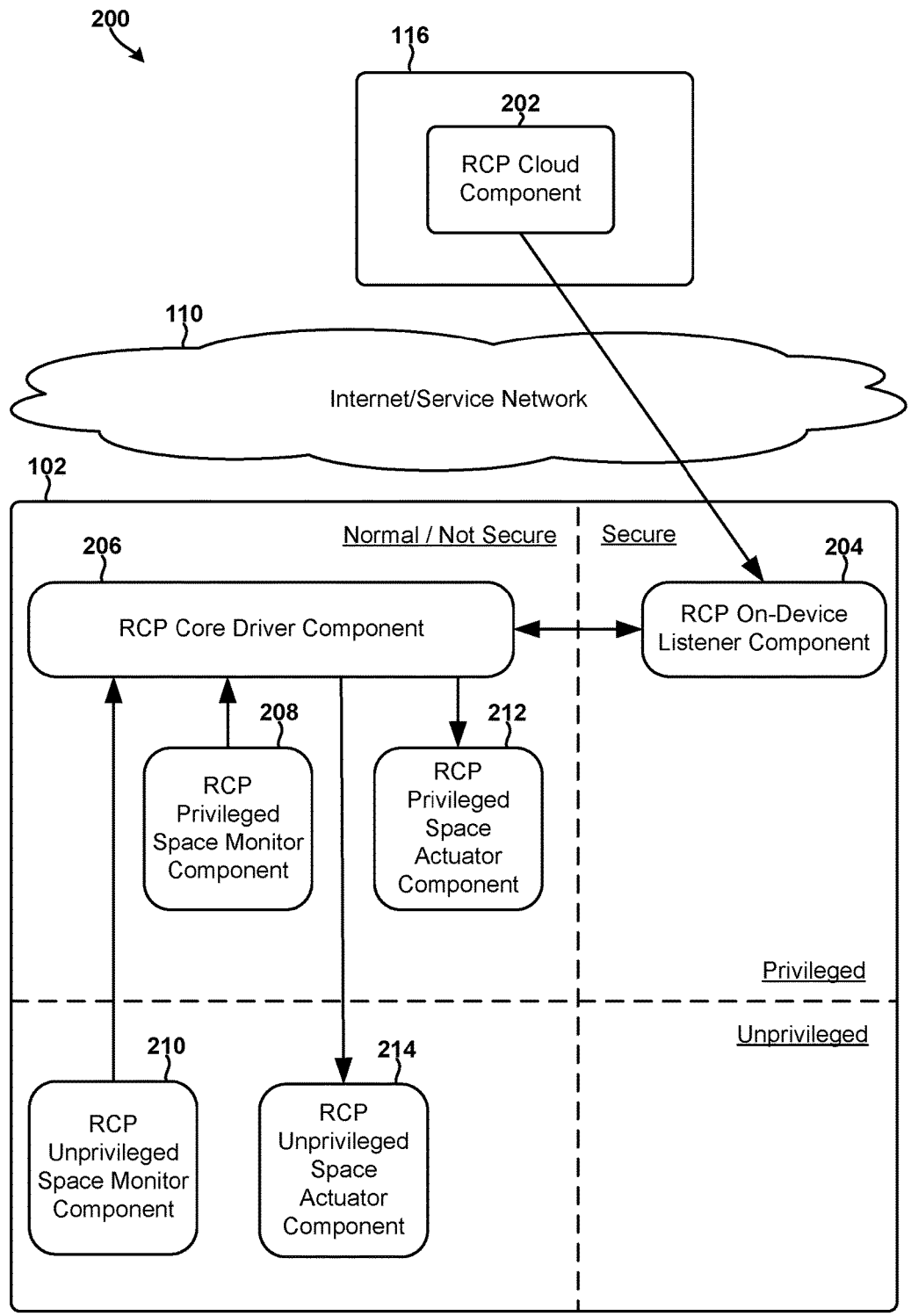
FIG. 2A is a block diagram illustrating example logical components and information flows in a client computing device configured to temporarily implement customized security measures in accordance with an embodiment.

FIG. 2A illustrates components and information flows in a system 200 that may be configured to intelligently identify and respond to threats in accordance with various embodiments. In the example illustrated in FIG. 2A, the system 200 includes a network server 116 and a client device 102. The network server 116 may include a reactive code protect (RCP) cloud component 202. Alternatively or in addition, the network server 116 may include one or more mobile threat intelligence (MTI) cloud components (described below with reference to FIG. 10), or implement all or portions of a MTI system.

The client device 102 may include secure computing environment that includes an unprivileged-normal portion, an unprivileged-secure portion, a privileged-normal portion and a privileged-secure portion. In addition, the client device 102 may include reactive code protect (RCP) on-device listener component 204, an RCP core driver component 206, an RCP privileged space monitor component 208, an RCP unprivileged space monitor component 210, an RCP privileged space actuator component 212, and an RCP unprivileged space actuator component 214.

The components 202-214 may be implemented in software, hardware, or any combination thereof. In some embodiments, one or more of the components 202-210 may be implemented as software instructions executing on one or more processors of the client device 102. In various embodiments, the components 202-210 may be implemented within parts of the operating system (e.g., within the kernel, in the kernel space, in the user space, etc.), within separate programs or applications, in specialized hardware buffers or processors, or any combination thereof.

In some embodiments, the RCP on-device listener component 204 may be implemented or included in the privileged-secure portion of the secure computing environment. The RCP core driver component 206, the RCP privileged space monitor component 208, and an RCP privileged space actuator component 212 may be implemented or included in the privileged-normal portion of the secure computing environment. The RCP unprivileged space monitor component 210 and the RCP unprivileged space actuator component 214 may be implemented or included in the unprivileged-normal portion of the secure computing environment.

The RCP cloud component 202 may be an information security risk management (ISRM) system or component that is configured to receive reports from a plurality of devices (e.g., client computing devices, security servers, etc.), and use the received reports to analyze various conditions, events or behaviors. The RCP cloud component 202 may identify new and emerging risks or threats, analyze identified threats, and determine the characteristics of the identified threats. The RCP cloud component 202 may generate threat-profiles, and publish or send the threat-profiles to the client device 102.

In some embodiments, the RCP cloud component 202 may be configured to use information from third-party or cloud services to analyze received from the client device 102 in multiple ways, in multiple passes, for different kinds of threats, using multiple analysis techniques, using multiple different types of software engines, etc. The RCP cloud component 202 network server 116 may generate one or more threat scores based on the analysis, and send the generated one or more threat scores to the client computing device.

The RCP on-device listener component 204 may be configured to monitor a port or listen to receive threat-profiles (or threat scores) from the network server 116 or RCP cloud component 202. The RCP on-device listener component 204 may securely communicate (or send across different protection domains) a received threat-profile to the RCP core driver component 206.

The RCP core driver component 206 may be a kernel driver component that is configured to analyze the threat-profiles and intelligently enhance the client device's security. The RCP core driver component 206 may generate analysis results, and use the analysis results to identify existing defense or security measures available on the device 102 that could be used to protect the device 102 for the identified threat. As part of these operations, the RCP core driver component 206 may determine or identify relevant components or software applications in different privilege domains (e.g., applications that are running in the user or unprivileged space, applications that are running in the kernel or privileged space, etc.).

In some embodiments, the RCP core driver component 206 may request that the RCP privileged space monitor component 208 and/or the RCP unprivileged space monitor component 210 monitor the identified components and collect system and/or state information.

The RCP privileged space monitor component 208 and the RCP unprivileged space monitor component 210 may be configured to collect system and/or state information from the components in their respective protection and privilege domains, and send the collected information to the RCP core driver component 206. The RCP core driver component 206 may receive and use this local system/state information in conjunction with the information included in the received threat profile to devise a customized security response (e.g., an exploit-profile-specific response) and/or to identify components or software applications (in different privilege and/or protection domains) that could be used to implement the customized security response.

The RCP core driver component 206 may communicate with the RCP privileged space actuator component 212 and RCP unprivileged space actuator component 214 to implement a customized security response (exploit-profile-specific response). Such a customized security response may include, for example, adjusting or altering the operations or functionality of various components or software applications operating on the client device.

The RCP privileged space actuator component 212 and RCP unprivileged space actuator component 214 may be configured to implement the customized security response (exploit-profile-specific response), such as by adjusting or altering the operations or functionality of components or software applications in their respective privilege domains.

Figure 2B:
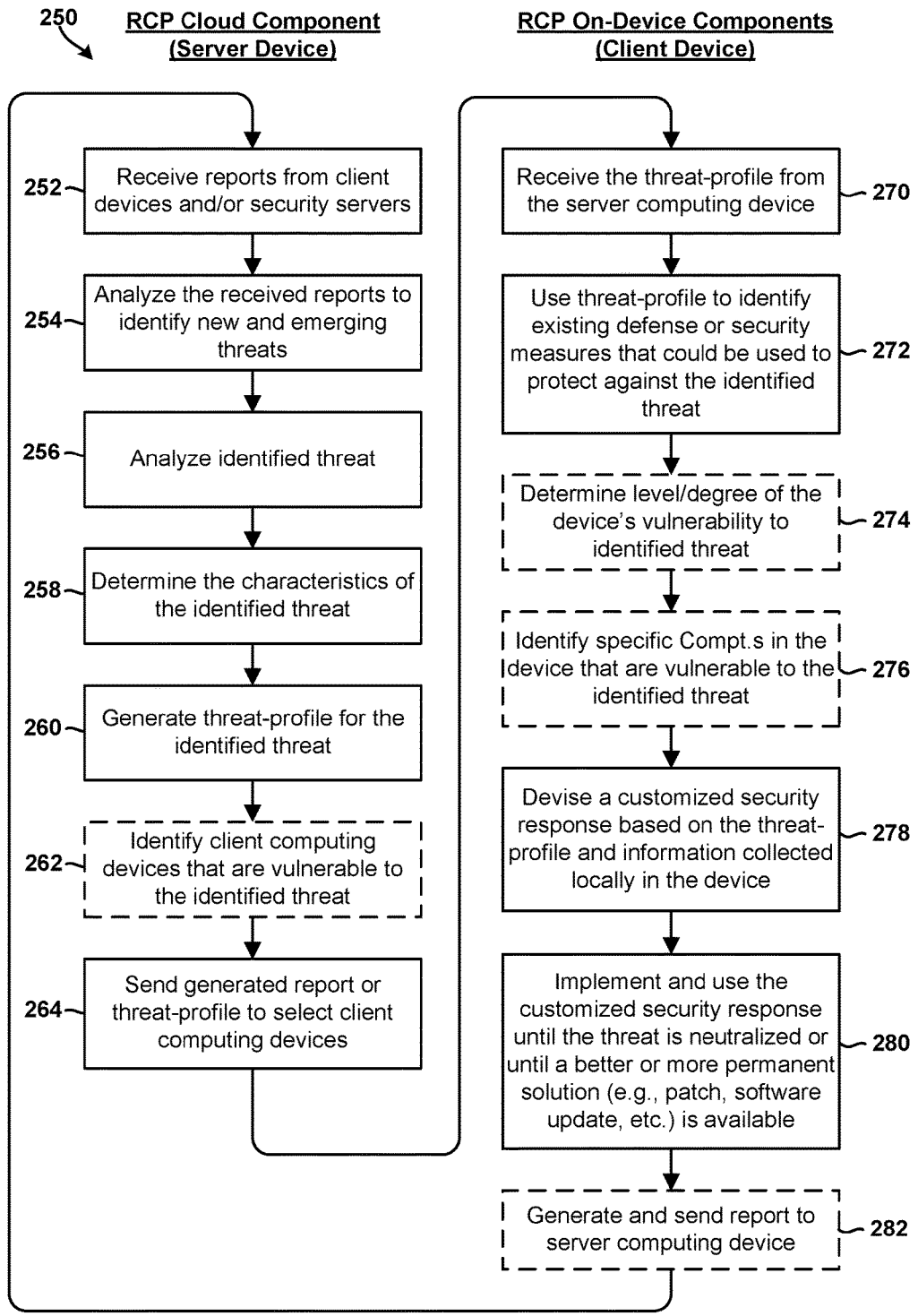
FIG. 2B is a process flow diagram illustrating a method for identifying and responding to newly discovered threats in accordance with an embodiment.

FIG. 2B illustrates a method 250 for efficiently identifying and responding to potentially non-benign applications (e.g., malware, etc.) and other threats that could have a negative impact on the performance of a client computing device in accordance with some embodiments. The method 250 may be performed by processors in a system that includes a server computing device 116 that implements all or portions of a RCP cloud component 202, and a client computing device 102 that implements all or portions of various RCP components (e.g., components 204-214 illustrated in FIG. 2A).

In block 252, a server processor in the server computing device may receive reports from client devices and/or various security servers (e.g., antivirus servers, behavior analysis server, etc.). In some embodiments, the server processor may collate, combine, amalgamate, or correlate the reports received from a plurality of client devices and/or the reports received from a plurality of security servers.

In block 254, the server processor may analyze the received reports (or various conditions, events or behaviors identified based on the received reports) to identify new and emerging threats (e.g., new attack vectors, new exploits, a new and potentially non-benign software application, etc.). In block 256, the server processor may use static analysis, dynamic analysis, behavior-based analysis, machine learning techniques, data-flow analysis, heuristics, speculation, etc. to analyze identified threat and generate threat analysis results. In block 258, the server processor may determine the characteristics of the identified threat (e.g., based on information included in the received reports, the generated threat analysis results, etc.).

In various embodiments, the server processor may identify threats in block 254, generate the threat analysis results in block 256, and/or determine the characteristics of the identified threat based on any combination of the received reports, generated analysis information, historical information (e.g., collected from prior evaluations of related behaviors, etc.), combined results, new information, machine learning, context modeling, detected changes in the available information, device states, environmental conditions, network conditions, device performance, battery consumption levels, etc.

In block 260, the server processor may generate a threat-profile for the identified threat. The threat-profile may be an information structure that includes information that represents or characterizes the identified threat. The threat-profile may also include information that indicates a specific software application is a threat, a list of non-benign activities performed by the software application, a list of vulnerabilities exploited by the software application in order to engage in non-benign activities, a list of features present in the target client computing device that could be exploited by the software application, and a list of defensive measures that could be implemented by the client device in order to restrict, prevent or protect against the non-benign activities of the software application, or other similar information.

In optional block 262, the server processor may identify client computing devices that are vulnerable to the identified threat. In block 264, the server processor may send the generated report or threat-profile to the identified or select client computing devices. For example, the server processor may determine that only devices that are physically located within a specific geographical area are vulnerable to the threat, and send the generated threat-profile to only the client devices that are close to that specific geographical area.

In block 270, a device processor in a client computing device may receive a threat-profile from the server computing device. The threat profile may be received via any of a number of different communication paths available between the server and the client computing device, such as a connection to the Internet (e.g., via broadcast, narrow cast or multicast Internet communications), simple message system (SMS) message, email, etc. In some implementations, the client computing devices may be configured to periodically poll the server, such as via hypertext transfer protocol (HTTP) polling techniques, requesting delivery of any pending threat profile messages, and the server processor may transmit the generated report or threat-profile in block 264 to requesting client computing devices in response to the polling message.

In block 272, the device processor may use the information included in threat-profile (and information available locally on the device) to identify existing defense or security measures in the client computing device that could be used to protect against the identified threat.

In optional block 274, the device processor may determine a level or degree of vulnerability to the identified threat(s) that exists on the client computing device. This determination may involve, for example, comparing characteristics of the threat identified in the threat profile to features, functionality, or applications on the client computing device, the user's typical usage patterns, the location of the client computing device, etc. to determine whether any threat characteristics are relevant to the client computing device.

In optional block 276, the device processor may identify a specific component (or a combination of components) in the client device that is vulnerable to the identified threat. For example, the device processor may compare characteristics of the threat identified in the threat profile to features, functionality, or applications on the client computing device, the user's typical usage patterns, the location of the client computing device, etc. to determine whether any threat characteristics are relevant to the client computing device.

In block 278, the device processor may devise a customized security response based on the threat-profile and information collected locally in the device (e.g., the components vulnerable to the identified threat, etc.). For example, the computing device may include multiple versions of important libraries (e.g., a regular version and a pointer-authenticated version, multiple alternatives, etc.). The device process may determine that the regular version of an important library is vulnerable to a threat, and devise a customized security response that includes using the pointer-authenticated version of that library. As another example, the device processor may devise a customized security response that includes using an enhanced or time varying address space layout randomization (ASLR).

The customized security response devised in block 278 may also include using an enhanced stack protection technique (e.g., one that re-randomizes canaries based on threat-impacted UIDs, etc.), monitoring and/or analyzing a larger number of behavior features, adding or implementing more policies (e.g., SELINUX policies, etc.), disabling or restricting certain input vectors (e.g., do not automatically process videos when an MIMS is received, etc.), adding a dash board that shows the user the extent of vulnerable software present on the device and/or server locations for downloading patches and secure updates, modify OS permissions (e.g., Linux permissions, etc.) for certain files, etc.

The customized security response devised in block 278 may also include a prioritized list of exploits that the device should focus on. In some embodiments, the device processor may determine the priorities based on an exploit-geo-heat-map included in the threat profile.

In block 280, the device processor may implement and use the customized security response until the threat is neutralized or until a better or more permanent solution (e.g., patch, software update, etc.) is available. As part of normal or enhanced security measures, the device processor may use its on-device security systems to analyze device behaviors and generate detailed reports (per its standard operation) until it receives another threat-profile.

In block 282, the device processor may generate and send a report of observed device behaviors to the server computing device. Thus, the server computing device and client computing devices may work cooperatively as a system, in which the server computing device recognizes security threats based on reports received from client computing devices, while providing client computing devices with alerts and threat information that enable client computing devices to take some risk mitigation measures before more permanent solutions become available and implemented on the devices.

Figure 3:
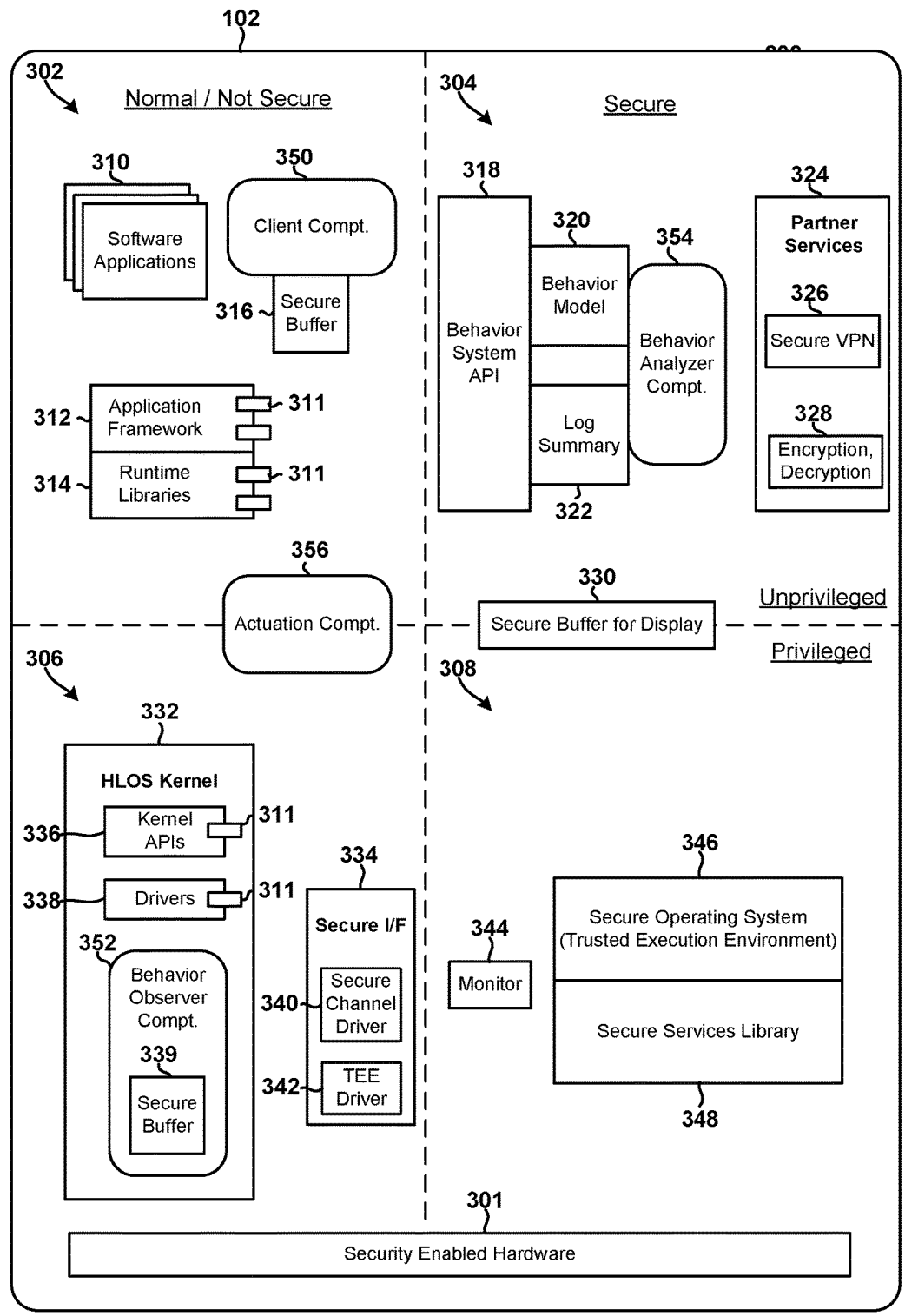
FIG. 3 is a block diagram illustrating example logical components and information flows in a client computing device that is configured to perform behavior-based analysis operations and generate reports in accordance with the various embodiments.

FIG. 3 illustrates an example behavior-based security system that could be included in a computing device, and used to analyze device behaviors and generate detailed reports in accordance with the various embodiments. In the example illustrated in FIG. 3, the behavior-based security system is included in a client device 102 that includes a secure computing environment. The secure computing environment includes security enabled hardware 301 and software divided into four protection domains/portions, namely an unprivileged-normal portion 302, an unprivileged-secure portion 304, a privileged-normal portion 306, and a privileged-secure portion 308.

The unprivileged-normal portion 302 may include software applications 310, an application framework 312, runtime libraries 314, a secure buffer component 316, and a client component 350. In some embodiments, the unprivileged-normal portion 302 may also include an actuation component 352. In some embodiments, the actuation component 352 may include the RCP unprivileged space actuator component 214 discussed above with reference to FIG. 2A.

The secure buffer component 316 may be configured to enable communication between various logical components and across protection domains/portions. In some embodiments, the secure buffer component 316 may be configured so that any module or component in any protection domain/portion 302-308 may write to its memory, but only components in the secure portions 304, 308 may read the information stored in the memory. For example, the secure buffer component 316 may be configured so that the behavior observer component 352, the behavior analyzer component 3544, and the partner services component 324 may write to its memory, but only the behavior analyzer component 354 and the partner services component 324 may read from its memory.

The unprivileged-secure portion 304 may include a behavior system API component 318, a behavior model component 320, a log summary component 322, and a behavior analyzer component 354. In some embodiments, the unprivileged-secure portion 304 may further include a partner services component 324 that includes a secure virtual private network (VPN) component 324 and an encryption/decryption component 328. In some embodiments, the unprivileged-secure portion 304 may also include a secure buffer for display 330, which may be suitable for communicating security-encrypted information generated in the unprivileged-secure portion 304 to an electronic display or display subsystem of the computing device. In some embodiments, the unprivileged-secure portion 304 may be configured so that buffer control may be transferred directly to the display subsystem (not illustrated).

The privileged-normal portion 306 may include a high level operating system (HLOS) kernel 332 and secure infrastructure 334. In some embodiments, the privileged-normal portion 306 may also include all or portions of an actuation component 352, which may include all or portions of the RCP unprivileged space actuator component 214 discussed above with reference to FIG. 2A. The HLOS kernel 332 may include a kernel API component 336, a drivers component 338 and a behavior observer component 352, which may include a secure buffer 339. The secure infrastructure 334 may include a secure channel driver component 340 and a secure operating system or trusted execution environment driver component 342. In some embodiments, the privileged-normal portion 306 may also include an actuation component 210. In some embodiments, the secure buffer 339 may include or share a memory with the secure buffer 316.

The privileged-secure portion 308 may include a monitor component 344, a secure operation system or trusted execution environment component 346, and a secure services library component 348. In some embodiments, the privileged-secure portion 308 may also include a secure buffer for display 330.

In some embodiments, the client device 102 may further include a secure file system (not illustrated) suitable for long term and secured storage of data, threat profiles, and behavior models. In some embodiments, the secure file system may be configured to store longer term data in encrypted form. In some embodiments, the secure file system may be configured to store data that is updated infrequently.

In some embodiments, the client device 102 may further include a secure communication link (not illustrated) suitable for communicating with a network server 116 and/or a component in a cloud service or network 118. The secure communication link may be configured to support sending and receiving information (e.g., reports, threat scores, threat profiles, etc.) to and from an external server 116, 118, which may be achieved in the unprivileged-secure portion 304 via the partner services component 324 in some embodiments. For example, the secure VPN component 326 may receive encrypted data (e.g., threat scores, threat profiles, etc.) from a network server 116, the encryption/decryption component 328 may decrypt the received data in the unprivileged-secure portion 304 and send the decrypted data to the client component 350 in the unprivileged-normal portion 302.

The application framework 312, runtime libraries 314, kernel APIs 336, and drivers 338 may each include an instrumented API 311, which may be used by the behavior observer component 352 to collect behavior information from each respective component 312, 314, 336, 338. Further, since these component 312, 314, 338, and 352 are situated in the normal portions of the secure system, data (e.g., behavior information, etc.) may be sent from components in the unprivileged-normal portion 302 to the behavior observer component 352 in the privileged-normal portion 306 with minimal latency and without consuming a significant amount of the processing and battery resources of the client device. In addition, by situating the behavior observer component 352 in the privileged-normal portion 306 (as opposed to the unprivileged portion 302), the behavior observer component 352 is protected from unauthorized access by user-level software applications 310, which may be malicious, buggy or otherwise contribute to the performance degradation of the client device 102.

The behavior observer component 352 may be configured to perform cross-layer observations on various client device modules, components, and sub-systems encompassing web-kit, SDK, NDK, kernel, drivers, and hardware in order to characterize the client device behavior.

The behavior observer component 352 may be configured to instrument or coordinate various application programming interfaces (APIs) registers, counters, or other device components (herein collectively "instrumented components") at various levels of the computing device system (e.g., at the hardware, driver, kernel, NDK, SDK, and/or Webkit levels, etc.), and collect behavior information from the instrumented components. For example, behavior observer component 352 collect information pertaining to library API calls in an application framework or run-time libraries, system call APIs, file-system and networking subsystem operations, device (including sensor devices) state changes, and file system activities, creating or deleting files, read/write/seek operations, changing permissions, etc.

The behavior observer component 352 may also use the collected behavior information to generate behavior vector information structures (herein "behavior vectors") that each represent or characterize many or all of the observed behaviors associated with a specific software application, component, component, task, or process of the computing device. Each behavior vector may encapsulate one or more "behavior features." Each behavior feature may include an abstract number or symbol that represents all or a portion of an observed behavior. In addition, each behavior feature may be associated with a data type that identifies a range of possible values, operations that may be performed on those values, meanings of the values, etc. A computing device may use the data type to determine how the feature (or feature value) should be measured, analyzed, weighted, used, etc.

The behavior observer component 352 may communicate (e.g., via a memory write operation, function call, etc.) the collected behavior information or generated behavior vectors to the behavior analyzer component 354. The behavior analyzer component 354 apply the behavior vectors to classifier models to generate analysis results, and use the generated analysis results to determine whether a software application or device behavior is benign or non-benign. The behavior analyzer component 354 may classify a behavior as "suspicious" when the results of its behavioral analysis operations do not provide sufficient information to classify the behavior as either benign or non-benign A classifier model may be a behavior model that includes data and/or information structures (e.g., decision nodes, feature vectors, component lists, etc.) that may be used by the computing device processor to evaluate a specific factor, feature, or aspect of the device's behavior. For example, a classifier model may include a plurality of decision nodes in the form of decision stumps. Decision stumps are one level decision trees that have exactly one node (and thus one test question or test condition) and a weight value. Applying a behavior vector to a decision stump results in a binary answer (e.g., Yes or No). For example, if the condition tested by a decision stump is "is the frequency of Short Message Service (SMS) transmissions less than x per minute," applying a value of "3" to the boosted decision stump will result in either a "yes" answer (for "less than 3" SMS transmissions) or a "no" answer (for "3 or more" SMS transmissions).

Thus, applying a behavior vector to a classifier model may include simultaneously applying a plurality of values (in the behavior vector) to each of a plurality of decision stumps (in the classifier model) to generate a plurality of numerical values. Said another way, the process of applying a behavior vector to the boosted decision stumps in the lean classifier model may be performed in a parallel operation to generate a plurality of results. The processor may compute or determine a weighted average of the generated results. The processor may compare the computed weighted average (e.g., 0.5) to a first threshold value (e.g., 0.2) to determine whether the behavior may be classified as benign with a sufficiently high degree of confidence (e.g., whether 0.5<0.2). The processor may also compare the computed weighted average (e.g., 0.5) to a second threshold value (e.g., 0.8) to determine whether the behavior may be classified as not benign with a sufficiently high degree of confidence (e.g., whether 0.5>0.8). If the behavior cannot be classified as one of benign or non-benign with a high degree of confidence (e.g., 0.2<0.5<0.8), the processor may classify the behavior as a "suspicious" behavior or activity that requires further analysis. In some embodiments, the processor may generate detailed reports for behaviors or activities that are classified as suspicious or non-benign, and send the generated reports to the network server 116 for further analysis.

Figure 4:
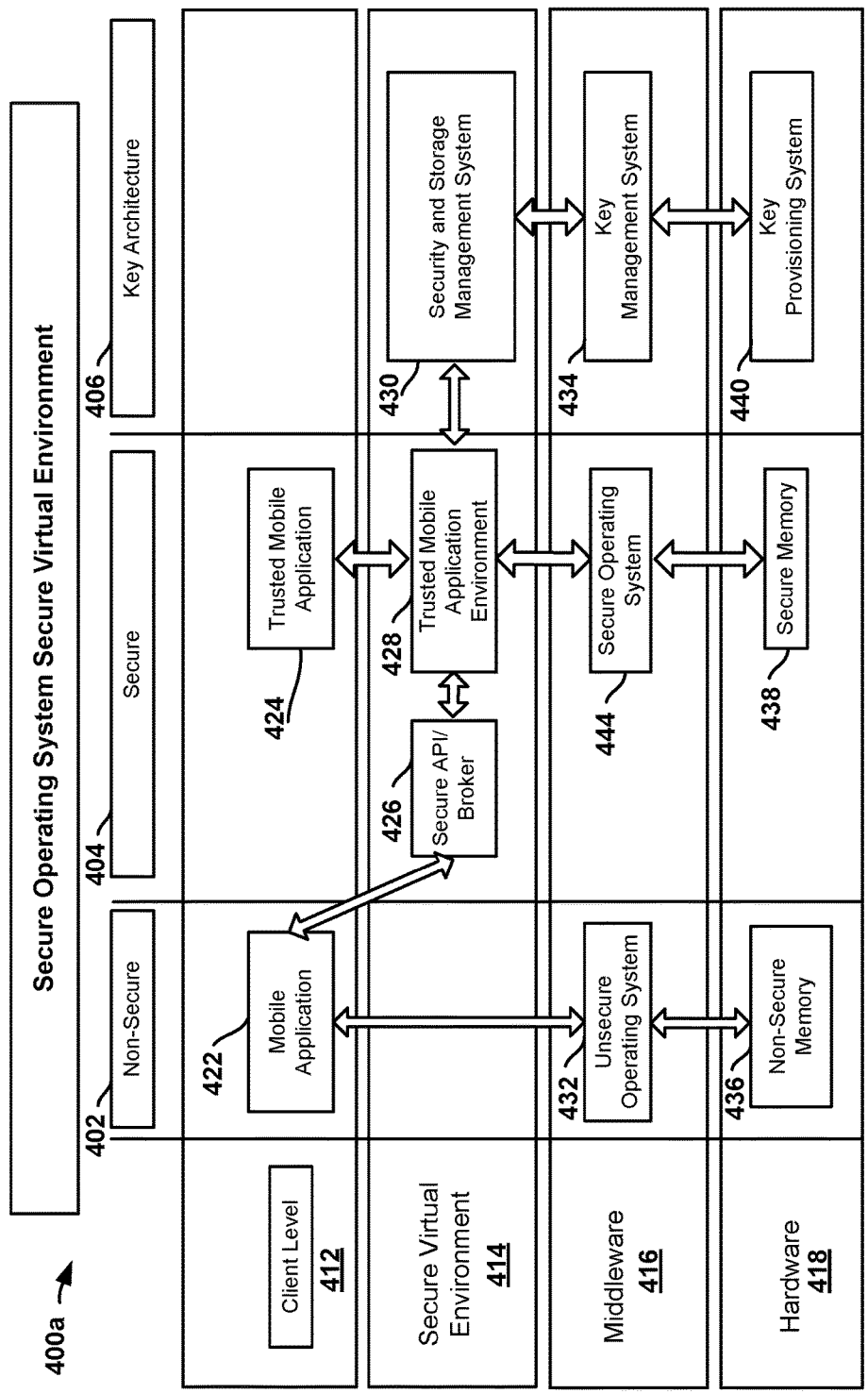
FIGS. 4-9 are system block diagrams of example trusted execution environments suitable for use in implementing various embodiments.

FIGS. 4-9 illustrate example components and information flows in a secure computing environment that is suitable for implementing various embodiments. Referring to FIG. 4, the overall system 400a or system architecture includes three areas; a non-secure area 402, a secure area 404, and a key architecture 406. The non-secure area 402 represents unprotected areas in which security protocols are not applied, the secure area 404 represents protected areas in which security protocols are applied, and the key architecture area 406 represents the areas in which client device security keys operate. The system 400a may be included in a computing device (e.g., client device 102 illustrated in FIGS. 1, 2A and 3) and used to identify and respond to threats in accordance with the various embodiments.

The software levels of the system 400a may be broken down into a client level 412, a secure virtual environment 414, a middleware level 416, and a hardware level 418. Client level 412 software may include general client device software applications 422 and trusted client applications 424, which may be pre-authorized software provided by a third party or which is identified as complying with specific security and/or operability requirements.

The secure virtual area 414 may be a software level or run time environment established on a client device. The secure virtual area 414 may be established using a single application or a group of applications. The secure virtual environment 414 may contain a secure broker 426 that acts as a gate keeper for the secure virtual environment 414 and controls the operation of data and client applications 422 received from the non-secure area 402.

The secure broker 426 may allow application designers to create client applications 422 that can operate in the secure virtual environment 414. In this manner, application designers need not interact with the third party entity directly to produce or provide applications to client devices. That is, an application designer may create a client application 422 that meets the security requirements of the secure virtual environment 414 independent of the corporate entity.

A device user may attempt to download or access the client application 422 stored in a non-secure area. In response, the secure broker 426 may determine if the client application 422 meets the security and operability requirements for the specific secure virtual environment 414 established on the client device. Should the client application 422 meet the security and operability requirements the client application 422 may be allowed to operate in the secure virtual environment 414 and be provided to the trusted client application environment 428. The trusted client application environment 428 may be an area of the secure virtual environment 414, including a GUI, in which the authorized applications operate. Should the client application 422 not meet the requirements of the secure broker 426, the client application 422 may be restricted from further interactions with the secure virtual environment 414.

Additionally the secure virtual environment 414 may include a security and storage management system 430 that interacts with the trusted client application environment 428 and the key management system 434 to provide necessary security and storage capability.

An unsecure operating system 432 may be provided on the client device in a non-secure area 402 and a non-secure memory 436 may be provided in a non-secure area 402. A client application 422 that does not meet the requirements of the secure broker 426 may only operate in the unsecure operating system 432 and may only write or read data to the non-secure memory 436.

Provided in the secure area 404 of the client device may be a secure operating system 444 and a secure memory 438. Trusted client applications 424 may be provided to the trusted client application environment 428. Trusted client applications 424, or client applications 422 that meet the requirements of the secure broker 426, may be provided to the secure operating system 444 through the trusted client application environment 428. Only applications in the trusted client application environment 428 interact with the secure operating system 444 and the secure memory 438. In the embodiment illustrated in FIG. 4 the non-secure memory 436, the secure memory 438 and the key provisioning system 440 reside at the hardware level 418.

Figure 5:
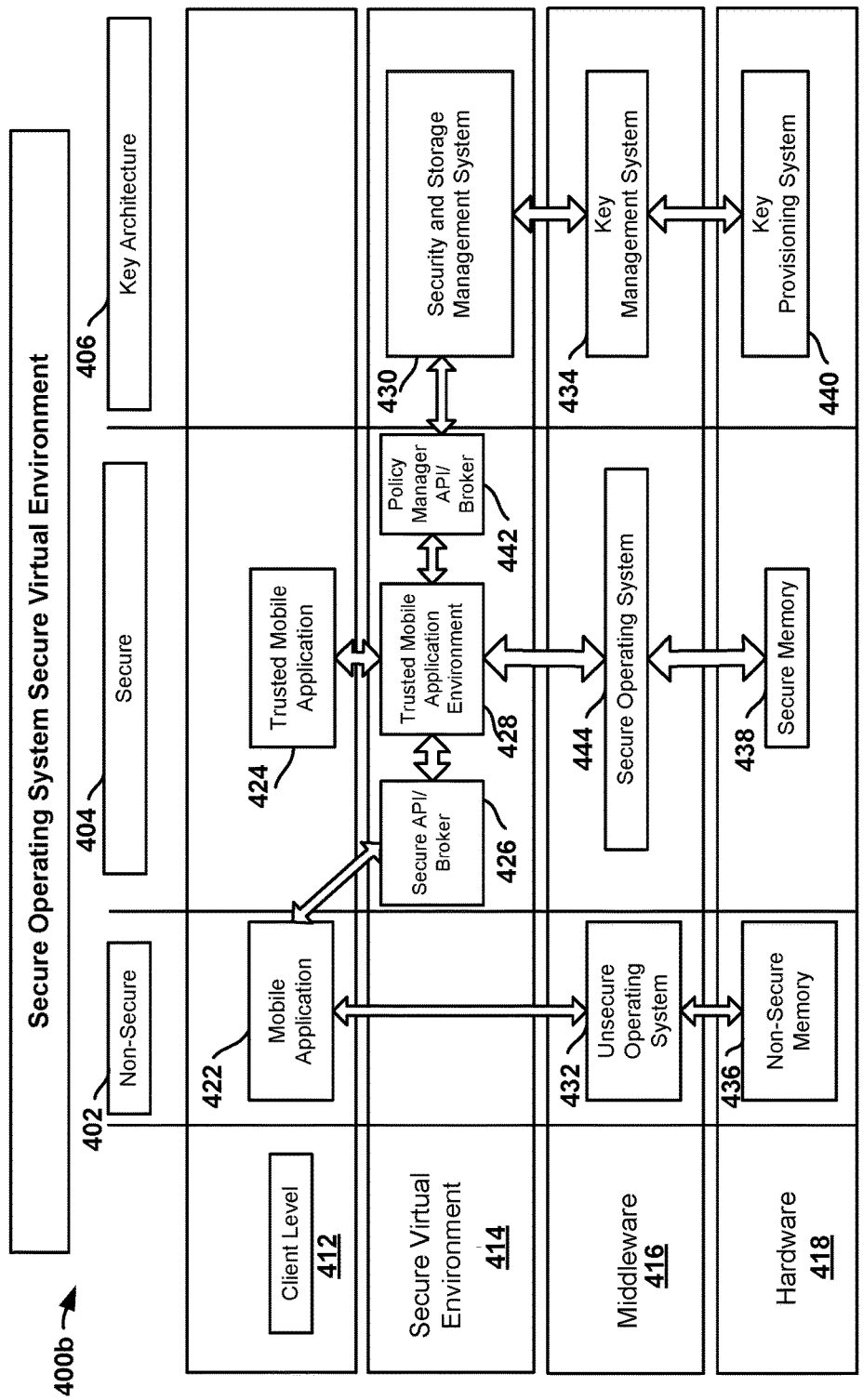

FIG. 5 illustrates another embodiment system 400b that is similar to those described above with reference to FIG. 4, with the addition of a policy manager broker 442 in the secure virtual environment. The system 400b may be included in a computing device (e.g., client device 102 illustrated in FIGS. 1, 2A and 3) and used to identify and respond to threats in accordance with the various embodiments.

With reference to FIG. 5, the policy manager broker 442 may be in communication with the security and storage management system 430 and the trusted client application environment 428. Through either the trusted client application environment 428, or the security and storage management system 430, the policy manager broker 442 may receive corporate policy updates from the corporate entity.

The policy manager broker 442 may enable the corporate entity to update security protocols, update operating restrictions, and perform various functions in the secure virtual environment 414 and the secure area 404 of the client device. The policy manager broker 442 gives the corporate entity the ability to remotely update and control the secure virtual environment 414 and secure area 404 of the client device.

Figure 6:
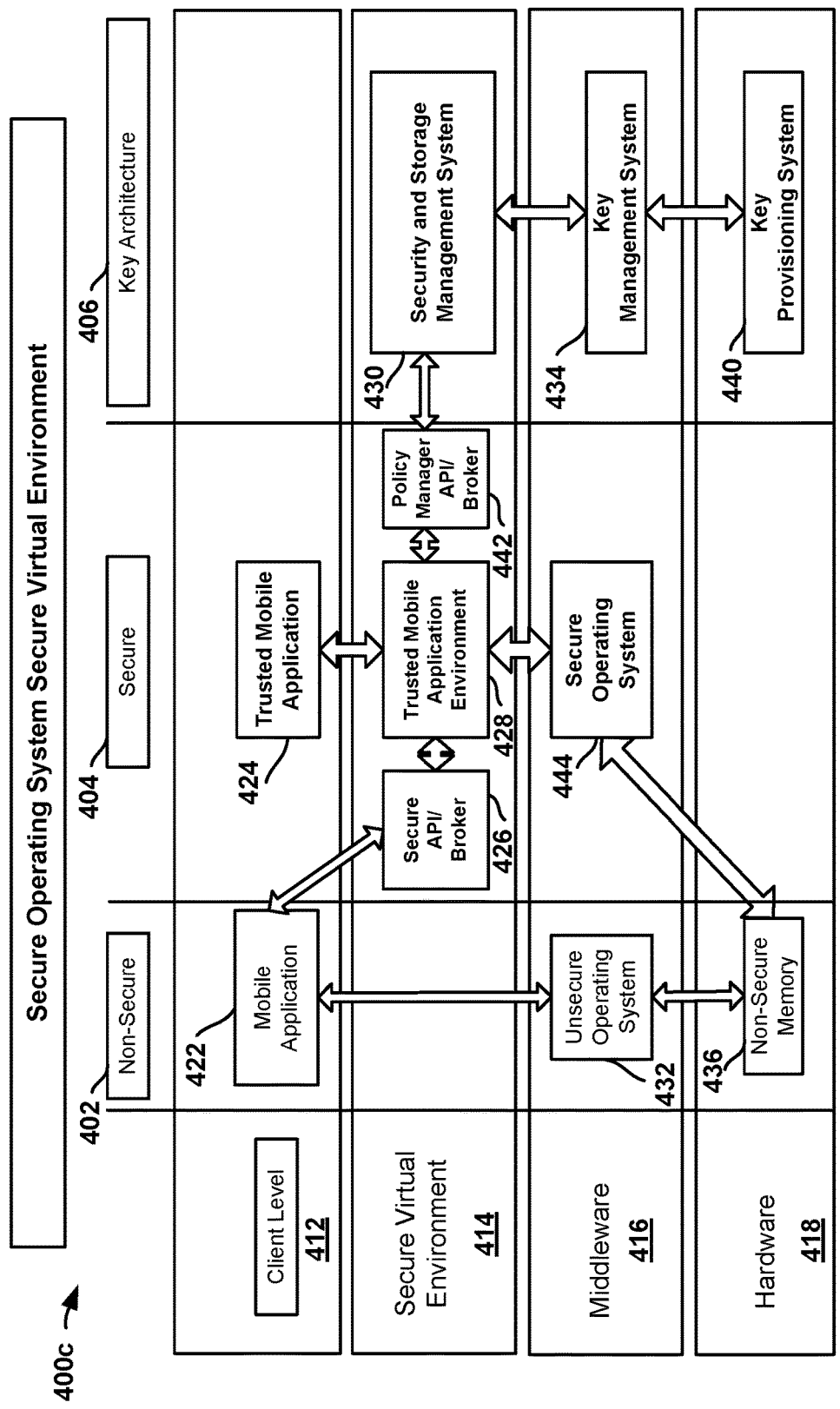

FIG. 6 illustrates another embodiment system 400c that includes components similar to those described above with respect to FIG. 5, including the policy manger broker 442, but with a single memory 436 on the client device. The system 400c may be included in a computing device (e.g., client device 102 illustrated in FIGS. 1, 2A and 3) and used to identify and respond to threats in accordance with the various embodiments.

In the example illustrated in FIG. 6, the secure operating system 444 and the unsecure operating system 432 both store and read data on the non-secure memory 436. Data in the secure virtual environment 414 may be stored in an encrypted form when not in use by the trusted client application environment 428. The continual application of encryption at the data level by the secure virtual environment 414 ensures that secure data may be stored in a non-secure memory 436 because the secure data itself will be encrypted at the data level.

Figure 7:
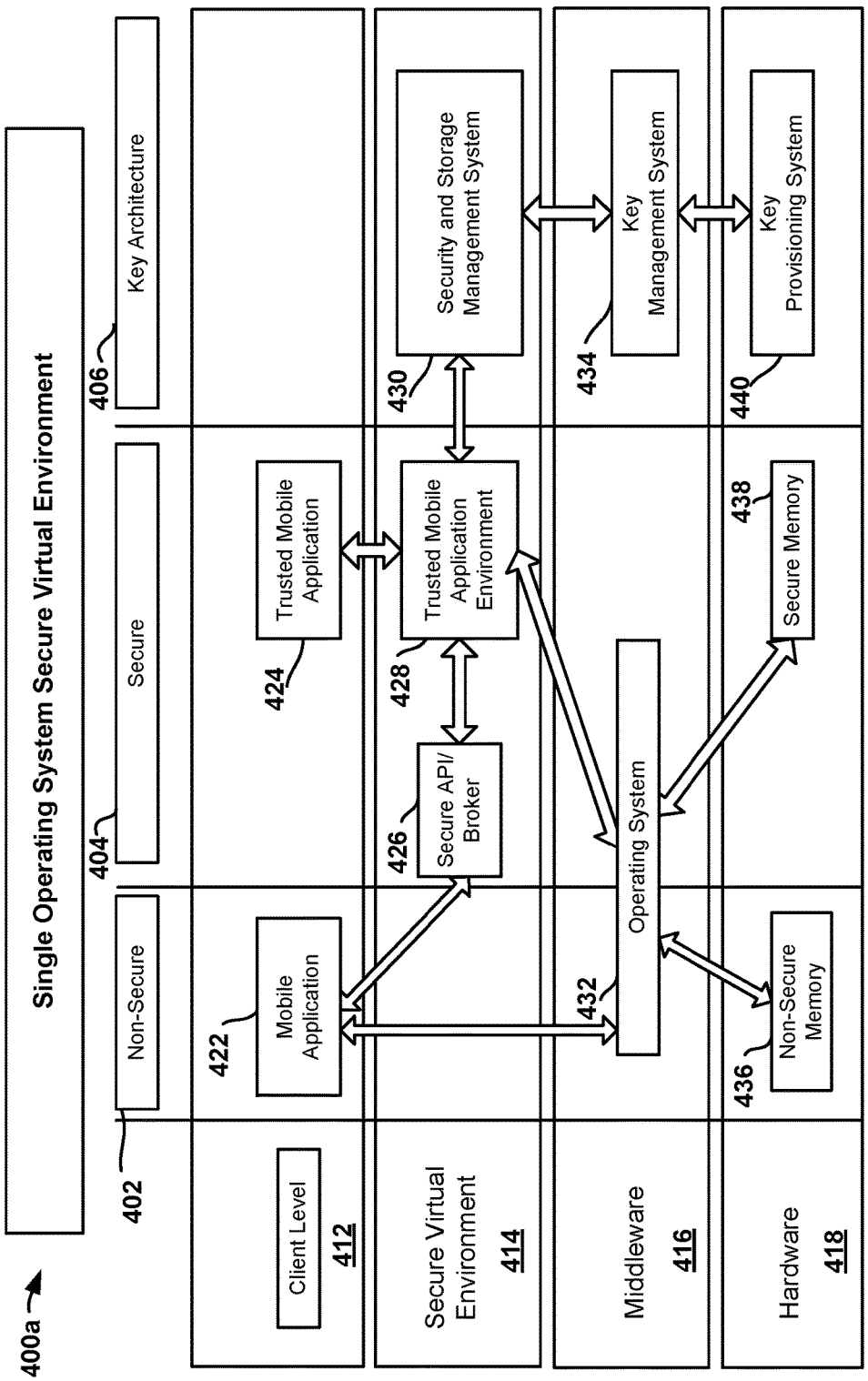
Figure 8:
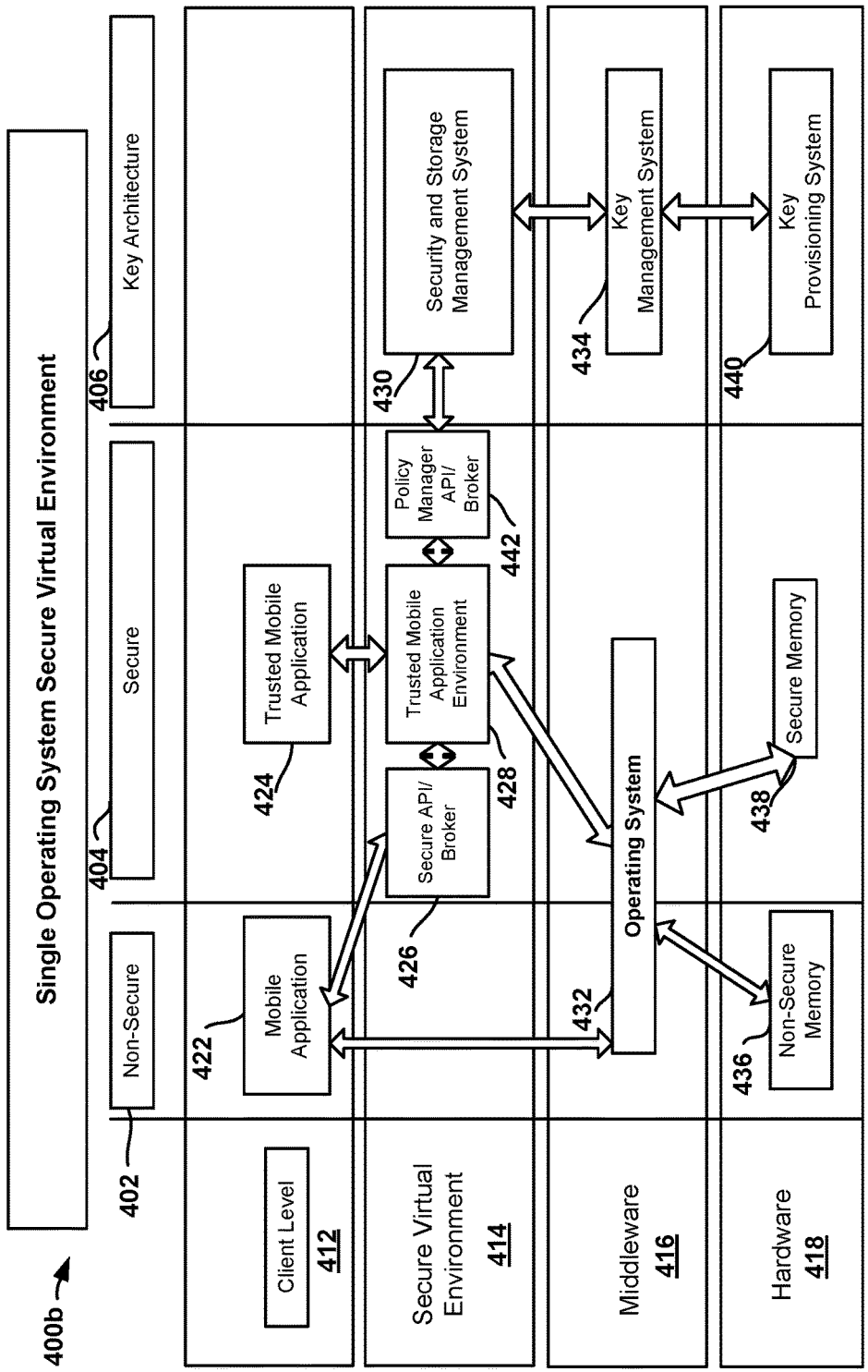
Figure 9:
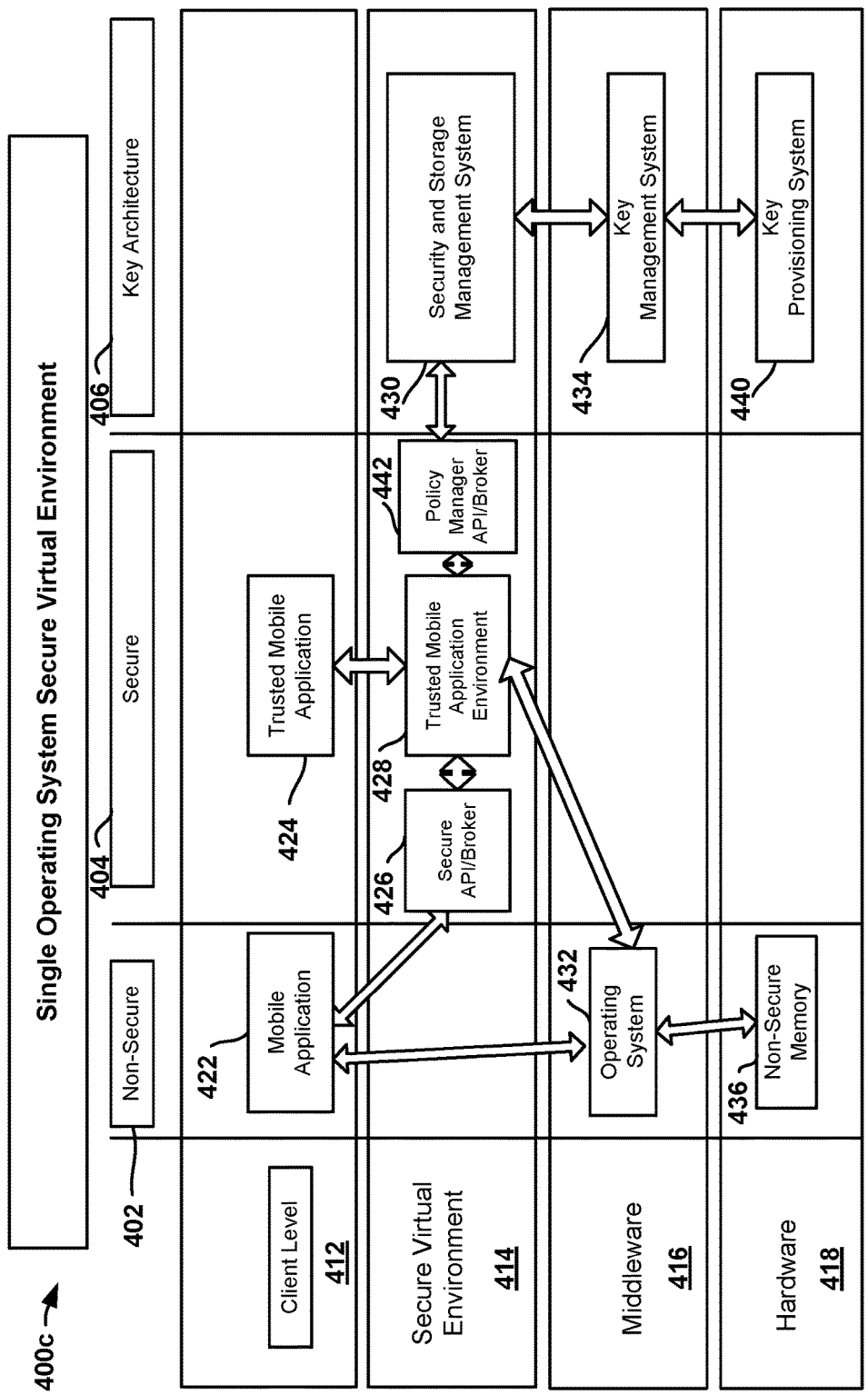

FIGS. 7-9 illustrate alternative embodiments of a secure virtual environment in which a client computing device (e.g., client device 102 illustrated in FIGS. 1, 2A and 3) is configured with a single operating system. Referring to FIG. 7, the overall system 400a architecture may include three areas; a non-secure area 402, a secure area 404, and a key architecture 406. The non-secure area 402 represents unprotected areas in which security protocols are not applied. The secure area 404 represents protected areas in which security protocols are applied. The key architecture 406 represents the areas in which client device security keys operate.

The software levels of the system 400a may be broken down into a client level 412, a secure virtual environment 414, a middleware level 416, and a hardware level 418.

Similar to the embodiments discussed above (e.g., with reference to FIG. 4, etc.), the client level 412 software includes client applications 422 and trusted client applications 424, also called simply trusted applications. Trusted client applications 424 may be applications specifically provided by the corporate entity that may be identified as meeting security requirements and authorized to handle corporate entity data and to operate on the corporate entity's networks and equipment. Trusted client applications 424 may be specific applications designed for the corporate entity or public applications that the corporate entity has previously established as meeting security requirements and operability requirements.

Similar to the embodiments discussed above, the secure virtual area 414 may be a software level or run time environment established on a client device. The secure virtual area 414 may be established using a single application or a group of applications. The secure virtual environment 414 may contain a secure broker 426 that acts as a gate keeper for the secure virtual environment 414 and controls the operation of data and client applications 422 received from the non-secure area 402.

Similar to the embodiments discussed above, the secure broker 426 may allow application designers to create client applications 422 that can operate in the secure virtual environment 414. In this manner, application designers need not interact with the corporate entity directly to produce applications, and provide applications to client devices. An application designer may create a client application 422 that meets the security requirements of the secure virtual environment 414 independent of the corporate entity.

Similar to the embodiments discussed above, a client device user may attempt to download or access the client application 422 stored in a non-secure area. In response, the secure broker 426 may determine if the client application 422 meets the security and operability requirements for the specific secure virtual environment 414 established on the client device. Should the client application 422 meet the security and operability requirements the client application 422 may be allowed to operate in the secure virtual environment 414 and be provided to the trusted client application environment 428. The trusted client application environment 428 may be an area of the secure virtual environment 414, including a GUI, in which the authorized applications operate. Should the client application 422 not meet the requirements of the secure broker 426, the client application 422 may not be allowed to interact further with the secure virtual environment 414.

Additionally the secure virtual environment may include a security and storage management system 430 that interacts with the trusted client application environment 428 and the key management system 434 to provide necessary security and storage capability.

An operating system 432 may be provided on the client device in both a non-secure area 402 and a secure area 404. The single operating system 432 interacts with the secure virtual environment 432 through the trusted client application environment 428 and client applications 422 in a non-secure area 402. The operating system 432 may be configured such that a client application 422 that does not meet the requirements of the secure broker 426 may only function in a non-secure area 402 of the operating system 432 and may only write or read data to the non-secure memory 436. The operating system 432 may also operate in the secure area 404 of the client device and read and write data to a secure memory 438.

Trusted client applications 424 may be provided to the trusted client application environment 428. Either trusted client applications 424, or client applications 422 that meet the requirements of the secure broker 426, may be provided to the operating system 444 through the trusted client application environment 428. Only applications in the trusted client application environment 428 interact with the secure memory 438 through the operating system 432. In the embodiment illustrated in FIG. 7 the non-secure memory 436, the secure memory 438 and the key provisioning system 440 reside at the hardware level 418.

FIG. 8 illustrates another embodiment system architecture 400b that includes components similar to those described above with reference to FIG. 7, with the addition of a policy manager broker 442 in the secure virtual environment. The policy manager broker 442 may be in communication with the security and storage management system 430 and the trusted client application environment 428. Through either the trusted client application environment 428, or the security and storage management system 430, the policy manager broker 442 may receive corporate policy updates from the corporate entity.

The policy manager broker 442 may enable the corporate entity to update security protocols, update operating restrictions, and perform various functions in the secure virtual environment 414 and the secure area 404 of the client device. The policy manager broker 442 gives the corporate entity the ability to remotely update and control the secure virtual environment 414 and secure area 404 of the client device.

FIG. 9 illustrates another embodiment of the system architecture 400c that includes components similar to those described above with respect to FIG. 8, but with a single memory 436 on the client device. Additionally, in this embodiment the operating system 432 resides entirely in the non-secure area 402. In this embodiment data from the trusted client application environment 428 and all other data passes to a single non-secure memory 436. All data in the secure virtual environment 414 may be stored in an encrypted form when not in use by the trusted client application environment 428. The continual application of encryption at the data level by the secure virtual environment 414 ensures that secure data may be stored in a non-secure memory 436 because the secure data itself will be encrypted at the data level.

Figure 10A:
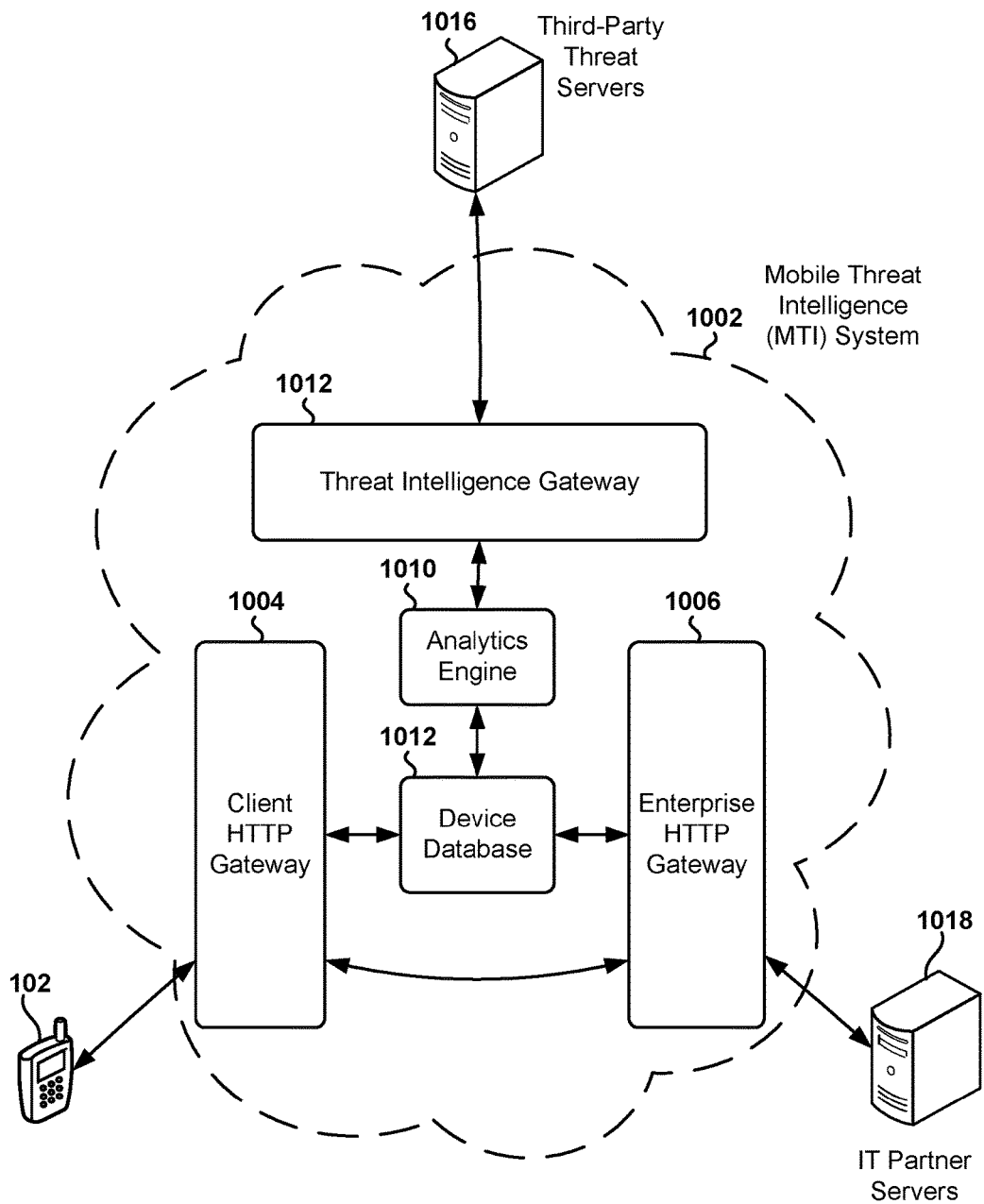
FIG. 10A is a block diagram illustrating components in a mobile threat intelligence system that may be configured to receive and use information from client computing devices, (third party) security servers, and information technology partners to analyze applications and generate threat scores in accordance with some embodiments.

FIG. 10A illustrates a mobile threat intelligence (MTI) system 1002 that may be configured to receive and use information from client devices 102, third party threat servers 1016, and information technology (IT) partner servers 1018 to analyze applications or behaviors to generate one or more threat scores in accordance with some embodiments. In some embodiments, all or portions of the mobile threat intelligence (MTI) system 1002 may be included in, or implemented by, a network server 116 (not illustrated separately in FIG. 10). In some embodiments, one or more processors in the network server 116 may be configured with processor executable instructions to implement to functionality or perform the operations of the MTI system 1002.

The MTI system 1002 may include various MTI components, such as the illustrated client HTTP gateway 1004, an enterprise HTTP gateway 1006, a device database 1012, an analytics engine 1010 and a threat intelligence gateway 1012. The client HTTP gateway 1004 may be configured to communicate with the client device 102, the device database 1012 and the enterprise HTTP gateway 1006. The enterprise HTTP gateway 1006 may be configured to communicate with the IT partner servers 1018, the device database 1012 and the client HTTP gateway 1004. The threat intelligence gateway 1012 may be configured to communicate with the third-party threat servers 1016 and the analytics engine 1010.

The MTI system 1002 may be a cloud-based web service that allows IP-accessible infrastructure to communicate with a corresponding client application on targeted devices (e.g., client devices 102) via standard web protocols. The MTI system 1002 may allow for updating client configurations, uploading reports and event-driven data, 'on-demand' querying of client statuses, etc. The MTI system 1002 may also integrate external sources of data such as third-party threat intelligence feeds (e.g., from third-party threat servers 1016) in order to determine whether anomalies or non-benign behaviors have occurred on the targeted devices. In addition, the MTI system 1002 may include enterprise integration point that allows IT partner servers 1018 to query reports and device status.

The MTI system 1002 may provide networking services for communication with client devices 102, provide networking services for communication with enterprise partners or IT partner servers 1018, provide ingestion services for third-party threat intelligence data feeds and/or networking services for communication with third-party threat servers 1016, persistent or queryable storage for provisioned device records, and an analytics engine for runtime processing of client-reported data.

The client HTTP gateway 1004 may be configured to manage MTI clients over-the-air. The client HTTP gateway 1004 may also include, publish, expose, or provide a command-and-control interface that enables remote configuration and command execution. In addition, the client HTTP gateway 1004 may be configured to manage the protocol states of client devices 102, add, register, or enroll client devices 102 to the device database 1012, authenticate client devices 102, provide device reporting configuration mechanisms (e.g., for receiving 'non-on-demand' reports from client devices 102 and storing the received reports in the device database 1012, etc.), provide on-demand reporting mechanisms based on enterprise origination (e.g., for polling the client devices or requesting 'on-demand' reports from the client devices 102, etc.), provide marshalling for data between the client devices 102 and the device database 1012 (e.g., for validating or verifying reports, etc.), and remove, deregister or disenroll the client devices 102 from the device database 1012.

The device database 1012 component may be configured to provide relational database management system (RDBMS) functionality and/or to perform create, read, update and delete (CRUD) operations for a persistent datastore for the client (device) records and their uploaded reports (e.g., 'non-on-demand' reports, 'on-demand' reports, etc.). The CRUD operations may be triggered by the client HTTP gateway 1004 or the enterprise HTTP gateway 1006. In some embodiments, the device database 1012 component may be configured to perform conflict resolution operations to manage or resolve clashing requests from the client HTTP gateway 1004 and the enterprise HTTP gateway 1006. In some embodiments, the device database 1012 component may be configured to perform Extract/Transform/Load (ETL) processing operations prior to storing the records in memory. The ETL operation allow incoming reports that vary in size and/or content (e.g., the parameters defined in the reporting configuration, unique state of each device at report time, security features that can be leveraged for each device, version and supported features of client software, etc.) to be stored in a flexible and scalable manner.

The enterprise HTTP gateway 1006 may be configured to manage all networked communications and data transfers between the MTI system 1002 and enterprise partners or IT partner servers 1018 via a backend integration API (BI-API). The commands sent over the BI-API may cause the device database 1012 to perform CRUD operations. In addition, the commands sent over the BI-API cause a direct data transfer between the client HTTP gateway 1004 and the enterprise HTTP gateway 1006 (e.g. for 'on-demand' MTI client reports, etc.).

The analytics engine 1010 component may be configured to provide runtime analysis and analytics for information stored in (or information that is to be stored in) the device database 1012. For example, the analytics engine 1010 component may be configured to receive alerts when an update event occurs in the device database 1012 (e.g. due to a recently uploaded client-originated report). In response, the analytics engine 1010 component may analyze and process the update event (or report) to determine whether a behavior or activity on the client devices is non-benign. In some embodiments, the analytics engine 1010 may include a score processing component that is configured to generate one or more threat scores for a software application, device behavior, or a client device 102. For example, the score processing component may query a device malware table and a Common Vulnerability Event (CVE) table to retrieve malware and scoring information, and use the retrieved information to determine one or more threat scores and their respective weights or criticalities.

The threat intelligence gateway 1012 may be configured to receive or ingest data (e.g., daily threat feeds, etc.) from a "queryable" third-party threat intelligence sources or third-party threat servers 1016. The queries may be triggered by the analytics engine 1010 component (e.g., based on discovery of a device-specific event, a suspicious update event, etc.).

The threat intelligence gateway 1012 may be configured to work in conjunction with the analytics engine 1010 in order to use the ingested data to analyze the application-related information. The threat intelligence gateway 1012 and/or the analytics engine 1010 may develop application-related information in multiple ways, in multiple passes, for different kinds of threats, and/or using multiple analysis techniques/software engines. The threat intelligence gateway 1012 and/or the analytics engine 1010 may generate one or more threat scores based on a results of these analysis operations. The threat intelligence gateway 1012 and/or the analytics engine 1010 may send the one or more threat scores to the relevant client device 102 via the client HTTP gateway 1004 or to a corporate or enterprise security manager component/server via the enterprise HTTP gateway 1006. In some embodiments, the threat intelligence gateway 1012 and/or the analytics engine 1010 may include the one or more threat scores in a threat-profile, or send the one or more threat scores independent of the threat-profile.

Figure 10B:
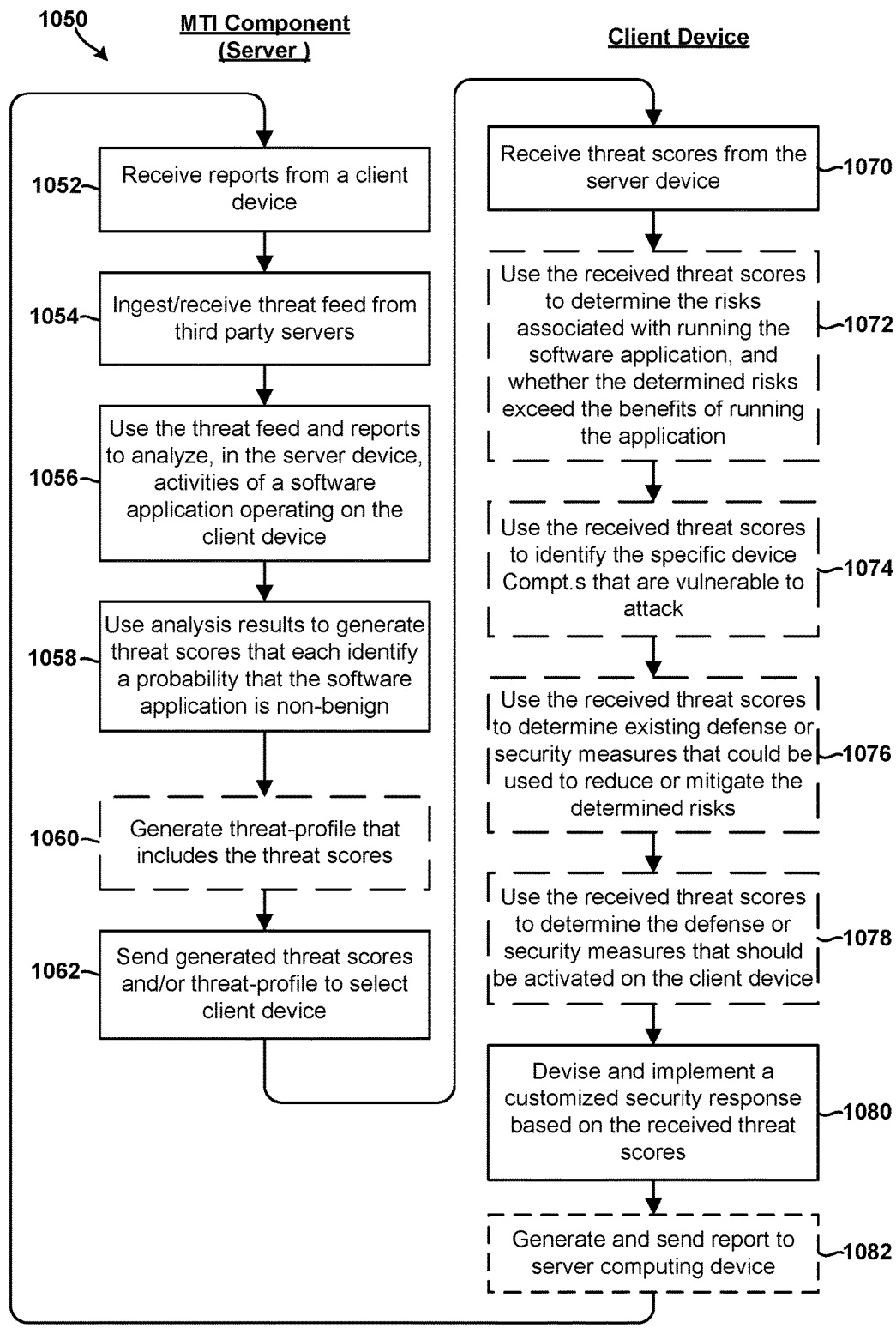
FIG. 10B is a process flow diagram illustrating a method for generating and using threat scores to implement customized security measures in accordance with an embodiment.

FIG. 10B illustrates a method 1050 for generating and using one or more threat scores to protect a client computing device in accordance with some embodiments. The method 1050 may be performed by processors in a system that includes a client computing device 102 and a server computing device 116 that implements all or portions of a mobile threat intelligence (MTI) system 1002.

In block 1052, the server device (or MTI component, server processor, etc.) may receive reports or application-related information from client devices. In block 1054, the server device may receive or ingest threat feeds (e.g., cyber threat intelligence feed, non-benign behavior intelligence report, etc.) from third party servers or cloud services.

In block 1056, the server device may use information included in the received/ingested threat feed(s) and information included in the received report(s) to analyze a software application and generate analysis results. For example, the server may use the ingested information (threat feeds) to analyze the received application-related information (included in the reports) in multiple ways, in multiple passes, for different types or kinds of threats, using multiple analysis techniques, using multiple different types of software engines, etc.

In block 1058, the server device may use the analysis results (i.e., results generated via the performance of the analysis operations in block 1056) to generate one or more threat scores. For example, the server device may analyze the software application in multiple passes in block 1056 to generate analysis results, and generate a threat score for each of the multiple passes in block 1058 based on the analysis results. As further examples, in block 1058, the server processor may generate a threat score for each type of analysis performed in block 1056, for each of the different types of software engines used in block 1056, etc.

In optional block 1060, the server device may generate a threat profile (e.g., via the operations discussed above with reference to FIGS. 2A and 2B, etc.), and include the generated one or more threat scores in the threat-profile. Thus, the threat-profile may include one or more threat scores and additional threat profile information.

In block 1062, the server device may send the generated one or more threat scores (or threat-profile) to the client device 102. In some embodiments, the server device may be configured to cause the client computing device to locally devise and install a customized security response based on threat scores. For example, sending the generated one or more threat scores (or threat-profile) to the client device 102 in block 1062 may cause the runtime system in the client computing device to (automatically) use the received one or more threat scores to locally devise a customized security response.

In block 1070, a processor in the client device may receive the one or more threat scores from the server device. In some embodiments, each of the one or more received threat scores may identify a probability that a software application operating on the client computing device is suspicious or non-benign. For example, a threat score having a probability value of 0.5 may indicate that a third-party server determined that there is a fifty percent chance that the software application (or a behavior or activity associated with the software application) is non-benign. As another example, a threat score having a probability value of 0.9 may indicate that a third-party server determined that there is a high probability that the software application is non-benign (or a low probability that the software application is benign). A threat score having a probability value of 0.1 may indicate that the third-party server determined that there is a low probability that the software application is non-benign (or a high probability that the software application is benign). In this example, a threat score having a probability value between 0.1 and 0.9 may indicate that the third-party server could not determine with a sufficiently high degree of confidence whether the software application is benign or non-benign. A threat score having a probability value between 0.1 and 0.9 may also indicate that the third-party server classifies the software application as suspicious, and thus requiring further monitoring and analysis.

In addition, each of the one or more "threat scores" may include information, or may be associated with, a data type, a value, a range of values, a range of possible values, meanings of the values, information identify how the value should be measured, analyzed, weighted, used, etc.

In optional block 1072, the processor may use the received one or more threat scores to determine the risks associated with running the software application on the client device, and whether the determined risks exceed benefits associated with running the application on the client device. In some embodiments, this may be accomplished by computing a risk value based on the one or more threat scores (e.g., by computing a weighted average of the scores, etc.), and determining whether the computed risk value exceeds a threshold value. In another embodiment, this may be accomplished by displaying the risks to a user, prompting the user to authorize continued operation and use of the software on the client device.

In optional block 1074, the processor may use the received one or more threat scores to identify the specific device components that are vulnerable to attack. In optional block 1076, the processor may use the one or more received threat scores to determine existing defense or security measures (or components, systems, etc.) that could be used to reduce or mitigate the determined risks. Alternatively or in addition, in optional block 1076, the processor may use the received one or more threat scores to determine the level or degree of scrutiny that should be applied by one or more security systems on the computing device (e.g., in order to reduce or mitigate the determined risks, protect device components that are vulnerable to attack, etc.).

In optional block 1078, the processor may use the received one or more threat scores to determine the defense or security measures (or units, components, systems, etc.) that should be activated on the client device in order to mitigate or reduce the identified risks. For example, the processor may determine that activating the behavior observer 352, behavior analyzer 354 and actuation 356 components (illustrated and discussed with reference to FIG. 3) would significantly reduce or mitigate three out of six identified risks. As another example, the processor may determine that focusing the operations of the behavior observer 352 on monitoring communication circuitry would significantly reduce or mitigate all or a portion of the identified risks. As another example, the processor may determine that deactivating communication circuitry of the device would protect the device from a suspicious gaming app without having a significant negative impact on the user experience.

In block 1080, the processor may devise, implement and/or install a customized security response (e.g., exploit-profile-specific response, etc.) based on the received one or more threat scores. In some embodiments, the operations of block 1080 may be performed in conjunction with the operations in optional block 1078. For example, in block 1080, the processor may devise a customized security response by intelligently identifying a subset of the determined defense or security measures (e.g., security system components determined in block 1078) that should be activated in order to balance tradeoffs between security, performance, and power efficiency in the computing device, and selecting only the identified measures for activation. The processor may implement or install a customized security response (or the devised response) by activating the identified measures. Non-limiting examples of measure that may be activated include the runtime system of the device executing a process associated with an on-device security system, powering on select hardware, changing an operating state of a device component, focusing the operations of an on-device security component, increasing the level of protection or scrutiny provided by an on-device real-time adaptive security component, etc. In some embodiments, installing the customized security response in block 1080 may include activating components (e.g., behavior observer 352, behavior analyzer 354, etc.) in different protection domains (e.g., unprivileged-normal portion, an unprivileged-secure portion, a privileged-normal portion, a privileged-secure portion, etc.) of a secure computing environment of the client device, including any or all of the secure computing environments discussed above with reference to FIGS. 3-9.

In optional block 1082, the processor may generate and send reports (e.g., application-related information, etc.) to the server computing device. Each report may include information on various conditions, events or behaviors detected in the client device. Each report may also include application-related information, collected behavior information, behavior vectors, results of real-time behavior analysis operations, success rates, behavior classifications, behavior signatures, modeling information, event-driven data, status information, state information, configuration information, security system information, etc.

Figure 11:
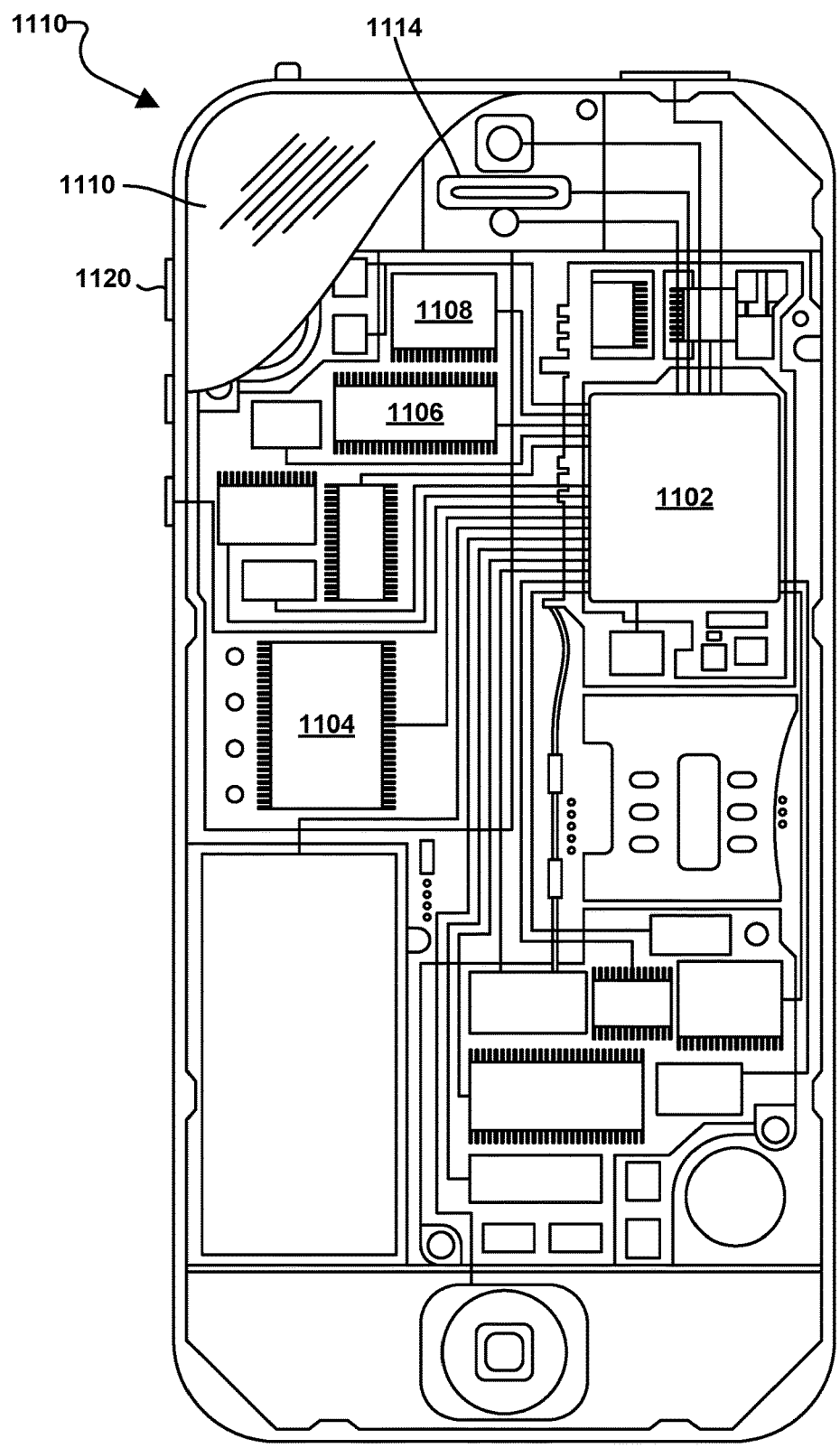
FIG. 11 is a component block diagram of a client device suitable for use in an embodiment.

The various embodiments may be implemented on a variety of client computing devices, an example of which is illustrated in FIG. 11 in the form of a smartphone. A smartphone 1100 may include a processor 1102 coupled to internal memory 1104, a display 1110, and to a speaker 1114. Additionally, the smartphone 1100 may include an antenna for sending and receiving electromagnetic radiation that may be connected to a wireless data link and/or cellular telephone transceiver 1108 coupled to the processor 1102. Smartphones 1100 typically also include menu selection buttons or rocker switches 1120 for receiving user inputs.

A typical smartphone 1100 also includes a sound encoding/decoding (CODEC) circuit 1106, which digitizes sound received from a microphone into data packets suitable for wireless transmission and decodes received sound data packets to generate analog signals that are provided to the speaker to generate sound. Also, one or more of the processor 1102, wireless transceiver 1108 and CODEC 1106 may include a digital signal processor (DSP) circuit (not shown separately).

Portions of the embodiment methods may be accomplished in a client-server architecture with some of the processing occurring in a server, such as analyzing various conditions, events or behaviors in order to identify new and emerging threats, maintaining databases of threat information and generating one or more threat scores or threat profiles, which may be accessed by a client computing device processor while executing the embodiment methods.

Figure 12:
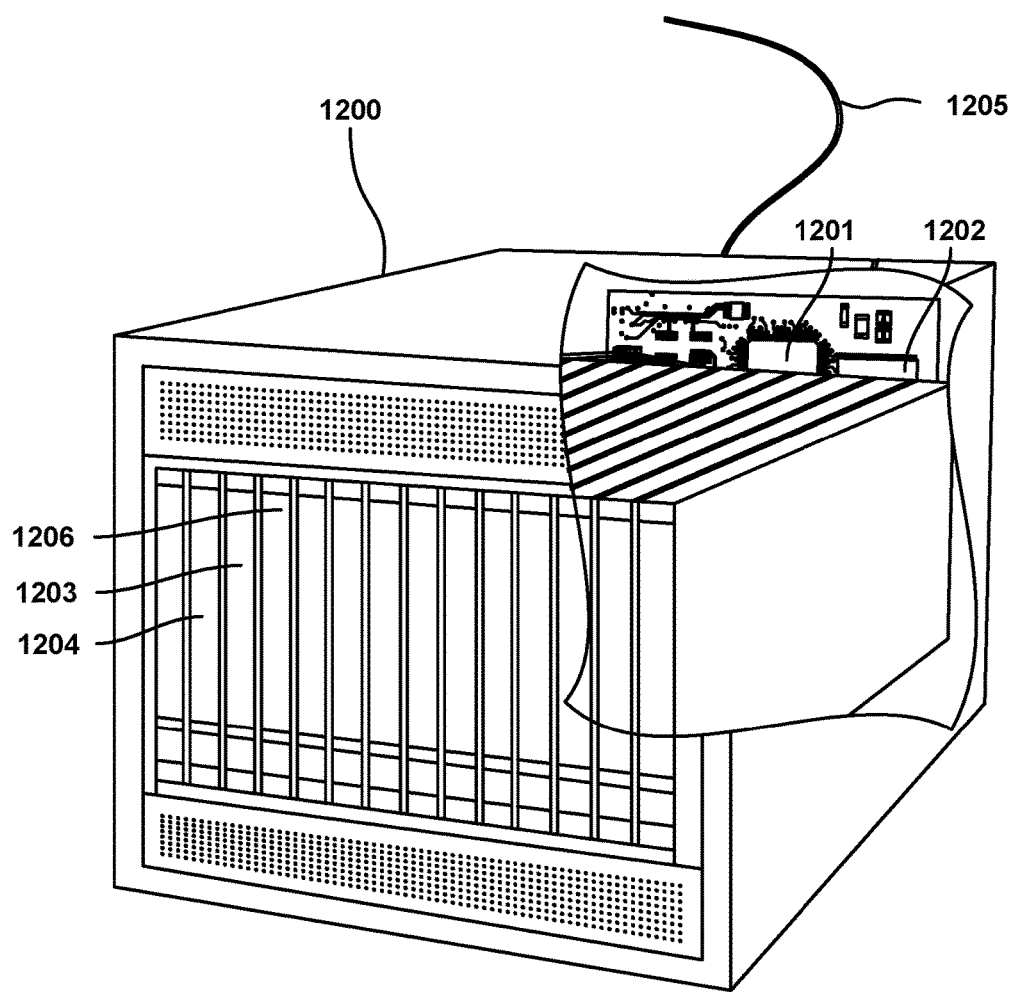
FIG. 12 is a component block diagram of a server device suitable for use in an embodiment.

Such embodiments may be implemented on any of a variety of commercially available server devices, such as the server 1200 illustrated in FIG. 12. Such a server 1200 typically includes a processor 1201 coupled to volatile memory 1202 and a large capacity nonvolatile memory, such as a disk drive 1203. The server 1200 may also include a floppy disc drive, compact disc (CD) or DVD disc drive 1204 coupled to the processor 1201. The server 1200 may also include network access ports 1206 coupled to the processor 1201 for establishing data connections with a network 1205, such as a local area network coupled to other broadcast system computers and servers.

The processors 1102, 1201 may be any programmable microprocessor, microcomputer or multiple processor chip or chips that can be configured by software instructions (applications) to perform a variety of functions, including the functions of the various embodiments described below. In some client computing devices, multiple processors 1102 may be provided, such as one processor dedicated to wireless communication functions and one processor dedicated to running other applications. Typically, software applications may be stored in the internal memory 1104, 1202, 1203 before they are accessed and loaded into the processor 1102, 1201. The processor 1102, 1201 may include internal memory sufficient to store the application software instructions.

A number of different cellular and mobile communication services and standards are available or contemplated in the future, all of which may implement and benefit from the various embodiments. Such services and standards include, e.g., third generation partnership project (3GPP), long term evolution (LTE) systems, third generation wireless mobile communication technology (3G), fourth generation wireless mobile communication technology (4G), global system for mobile communications (GSM), universal mobile telecommunications system (UNITS), 3GSM, general packet radio service (GPRS), code division multiple access (CDMA) systems (e.g., cdmaOne, CDMA1020™), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), and integrated digital enhanced network (iden). Each of these technologies involves, for example, the transmission and reception of voice, data, signaling, and/or content messages. It should be understood that any references to terminology and/or technical details related to an individual telecommunication standard or technology are for illustrative purposes only, and are not intended to limit the scope of the claims to a particular communication system or technology unless specifically recited in the claim language.

Computer program code or "program code" for execution on a programmable processor for carrying out operations of the various embodiments may be written in a high level programming language such as C, C++, C#, Smalltalk, Java, JavaScript, Visual Basic, a Structured Query Language (e.g., Transact-SQL), Perl, or in various other programming languages. Program code or programs stored on a computer readable storage medium as used in this application may refer to machine language code (such as object code) whose format is understandable by a processor.

Many computing devices operating system kernels are organized into a user space (where non-privileged code runs) and a kernel space (where privileged code runs). This separation is of particular importance in Android® and other general public license (GPL) environments where code that is part of the kernel space must be GPL licensed, while code running in the user-space may not be GPL licensed. It should be understood that the various software components or modules discussed here may be implemented in either the kernel space or the user space, unless expressly stated otherwise.

The foregoing method descriptions and the process flow diagrams are provided merely as illustrative examples, and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

As used in this application, the terms "component," "module," "system," "engine," "generator," "manager," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a computing device and the computing device may be referred to as a component. One or more components may reside within a process and/or thread of execution, and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known network, computer, processor, and/or process related communication methodologies.

The term "runtime system" may be used in this application to refer to a combination of software and/or hardware resources in a computing device that support the execution of an application program in that device. For example, a runtime system may include all or portions of the computing device's processing resources, operating systems, library modules, schedulers, processes, threads, stacks, counters, and/or other similar components. A runtime system may be responsible for allocating computational resources to an application program, for controlling the allocated resources, and for performing the operations of the application program. The runtime system may execute or perform all or portions of a software application in one or more hardware processing units (e.g., processor, a processing core, etc.) via processes, threads, or tasks.

Modern computing devices are highly configurable and complex systems. As such, the features that are most important for determining whether a particular device behavior is benign or not benign (e.g., malicious or performance-degrading) may be different in each computing device. Further, a different combination of features may require monitoring and/or analysis in each computing device in order for that device to quickly and efficiently determine whether a particular behavior is benign or non-benign. Yet, the precise combination of features that require monitoring and analysis, and the relative priority or importance of each feature or feature combination, can often only be determined using information available only on the client computing device.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a multiprocessor, but, in the alternative, the processor may be any conventional processor, controller, microcontroller, or state machine. A processor may also be implemented as a combination of computing devices, e.g., a combination of a DSP and a multiprocessor, a plurality of multiprocessors, one or more multiprocessors in conjunction with a DSP core, or any other such configuration. Alternatively, some steps or methods may be performed by circuitry that is specific to a given function.

In one or more exemplary embodiments, the functions described may be implemented in hardware, software, firmware, or any combination thereof. If implemented in software, the functions may be stored as one or more processor-executable instructions or code on a non-transitory computer-readable storage medium or non-transitory processor-readable storage medium. The steps of a method or algorithm disclosed herein may be embodied in a processor-executable software module, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method of protecting a client computing device, comprising:
    receiving threat profile information from a server computing device, the received threat profile information identifying a new threat and at least one characteristic of the new threat;
    using the received profile information and information collected in the client computing device to locally devise a customized security response to the new threat in response to determining that the client computing device is vulnerable to the new threat;
    installing the customized security response to protect the client computing device from the new threat before a security patch or software update is available; and
    uninstalling the customized security response in response to determining that an offset period has expired.

2. The method of claim 1, further comprising using the received profile information and information collected in the client computing device to determine whether the client computing device is vulnerable to the new threat,
    wherein using the received profile information and information collected in the client computing device to locally devise the customized security response to the new threat is performed in response to determining that the client computing device is vulnerable to the new threat.

3. The method of claim 2, further comprising identifying a specific component in the client computing device that is vulnerable to the new threat, wherein using the received profile information and information collected in the client computing device to locally devise the customized security response comprises:
    devising the customized security response based on the specific component determined to be vulnerable to the new threat.

4. The method of claim 2, further comprising determining a vulnerability level of the client computing device based on the received profile information, wherein using the received profile information and information collected in the client computing device to locally devise the customized security response to the new threat comprises:
    devising the customized security response based on the determined vulnerability level.

5. The method of claim 1, further comprising:
    determining whether the security patch or software update is available; and
    uninstalling the customized security response prior to expiration of the offset period in response to determining that the security patch or software update is available.

6. The method of claim 1, wherein receiving threat profile information from the server computing device comprises:

polling the server computing device for threat profile information; and receiving the threat profile information from the server computing device in response to the polling.

7. The method of claim 1, further comprising:

analyzing a behavior of the client computing device;

generating a report based on results of analyzing the behavior; and sending the generated report to the server computing device.

8. The method of claim 1, further comprising:

receiving in the server computing device a plurality of reports;

identify the new threat based on a result of analyzing the received reports;

analyzing the new threat to determine characteristics of the new threat and generate a threat profile; and sending the generated threat profile to the client computing device.

9. The method of claim 8, further comprising determining in the server computing device whether the client computing device is vulnerable to the new threat, wherein sending the generated threat profile to the client computing device comprises sending the generated threat profile to the client computing device in response to determining that the client computing device is vulnerable to the new threat.

10. A client computing device, comprising:

means for receiving threat profile information from a server computing device, the received threat profile information identifying a new threat and at least one characteristic of the new threat;

means for using the received profile information and information collected in the client computing device to locally devise a customized security response to the new threat in response to determining that the client computing device is vulnerable to the new threat;

means for installing the customized security response to protect the client computing device from the new threat before a security patch or software update is available; and means for uninstalling the customized security response in response to determining that an offset period has expired.

11. The client computing device of claim 10, further comprising means for using the received profile information and information collected in the client computing device to determine whether the client computing device is vulnerable to the new threat, wherein means for using the received profile information and information collected in the client computing device to locally devise the customized security response to the new threat comprises means for locally devising the customized security response in response to determining that the client computing device is vulnerable to the new threat.

12. The client computing device of claim 11, further comprising means for identifying a specific component in the client computing device that is vulnerable to the new threat, wherein means for using the received profile information and information collected in the client computing device to locally devise the customized security response comprises means for devising the customized security response based on the specific component determined to be vulnerable to the new threat.

13. The client computing device of claim 11, further comprising means for determining a vulnerability level of the client computing device based on the received profile information, wherein means for using the received profile information and information collected in the client computing device to locally devise the customized security response to the new threat comprises means for devising the customized security response based on the determined vulnerability level.

14. The client computing device of claim 10, further comprising:

means for determining whether the security patch or software update is available; and means for uninstalling the customized security response prior to expiration of the offset period in response to determining that the security patch or software update is available.

15. The client computing device of claim 10, wherein means for receiving threat profile information from the server computing device comprises:

means for polling the server computing device for threat profile information; and means for receiving the threat profile information from the server computing device in response to the polling.

16. The client computing device of claim 10, further comprising:

means for analyzing a behavior of the client computing device;

means for generating a report based on results of analyzing the behavior; and means for sending the generated report to the server computing device.

17. A client computing device, comprising:

a processor configured with processor-executable instructions to perform operations comprising:

receiving threat profile information from a server computing device, the received threat profile information identifying a new threat and at least one characteristic of the new threat;

using the received profile information and information collected in the client computing device to locally devise a customized security response to the new threat in response to determining that the client computing device is vulnerable to the new threat;

installing the customized security response to protect the client computing device from the new threat before a security patch or software update is available; and uninstalling the customized security response in response to determining that an offset period has expired.

18. The client computing device of claim 17, wherein:

the processor is configured with processor-executable instructions to perform operations further comprising using the received profile information and information collected in the client computing device to determine whether the client computing device is vulnerable to the new threat; and the processor is configured with processor-executable instructions to perform operations such that operations of using the received profile information and information collected in the client computing device to locally devise the customized security response to the new threat are performed in response to determining that the client computing device is vulnerable to the new threat.

19. The client computing device of claim 18, wherein:
the processor is configured with processor-executable instructions to perform operations further comprising identifying a specific component in the client computing device that is vulnerable to the new threat; and
the processor is configured with processor-executable instructions to perform operations such that using the received profile information and information collected in the client computing device to locally devise the customized security response comprises devising the customized security response based on the specific component determined to be vulnerable to the new threat.

20. The client computing device of claim 18, wherein:
the processor is configured with processor-executable instructions to perform operations further comprising determining a vulnerability level of the client computing device based on the received profile information; and
the processor is configured with processor-executable instructions to perform operations such that using the received profile information and information collected in the client computing device to locally devise the customized security response to the new threat comprises devising the customized security response based on the determined vulnerability level.

21. The client computing device of claim 17, wherein the processor is configured with processor-executable instructions to perform operations further comprising:
determining whether the security patch or software update is available; and
uninstalling the customized security response prior to expiration of the offset period in response to determining that the security patch or software update is available.

22. The client computing device of claim 17, wherein the processor is configured with processor-executable instructions to perform operations such that receiving threat profile information from the server computing device comprises:
polling the server computing device for threat profile information; and
receiving the threat profile information from the server computing device in response to the polling.

23. The client computing device of claim 17, wherein the processor is configured with processor-executable instructions to perform operations further comprising:
analyzing a behavior of the client computing device;
generating a report based on results of analyzing the behavior; and
sending the generated report to the server computing device.

24. A non-transitory computer readable storage medium having stored thereon processor-executable software instructions configured to cause a processor of a client computing device to perform operations comprising:
receiving threat profile information from a server computing device, the received threat profile information identifying a new threat and at least one characteristic of the new threat;
using the received profile information and information collected in the client computing device to locally devise a customized security response to the new threat in response to determining that the client computing device is vulnerable to the new threat;
installing the customized security response to protect the client computing device from the new threat before a security patch or software update is available; and
uninstalling the customized security response in response to determining that an offset period has expired.

25. The non-transitory computer readable storage medium of claim 24, wherein:
the stored processor-executable instructions are configured to cause the processor to perform operations further comprising using the received profile information and information collected in the client computing device to determine whether the client computing device is vulnerable to the new threat; and
the stored processor-executable instructions are configured to cause the processor to perform operations such that using the received profile information and information collected in the client computing device to locally devise the customized security response to the new threat is performed in response to determining that the client computing device is vulnerable to the new threat.

26. The non-transitory computer readable storage medium of claim 25, wherein:
the stored processor-executable instructions are configured to cause the processor to perform operations further comprising identifying a specific component in the client computing device that is vulnerable to the new threat; and
the stored processor-executable instructions are configured to cause the processor to perform operations using the received profile information and information collected in the client computing device to locally devise the customized security response comprises devising the customized security response based on the specific component determined to be vulnerable to the new threat.

27. The non-transitory computer readable storage medium of claim 25, wherein:
the stored processor-executable instructions are configured to cause the processor to perform operations further comprising determining a vulnerability level of the client computing device based on the received profile information; and
the stored processor-executable instructions are configured to cause the processor to perform operations such that using the received profile information and information collected in the client computing device to locally devise the customized security response to the new threat comprises devising the customized security response based on the determined vulnerability level.

28. The non-transitory computer readable storage medium of claim 24, wherein the stored processor-executable instructions are configured to cause the processor to perform operations further comprising:
determining whether the security patch or software update is available; and
uninstalling the customized security response prior to expiration of the offset period in response to determining that the security patch or software update is available.

29. The non-transitory computer readable storage medium of claim 17, wherein the stored processor-executable instructions are configured to cause the processor to perform operations such that receiving threat profile information from the server computing device comprises:
polling the server computing device for threat profile information; and
receiving the threat profile information from the server computing device in response to the polling.

30. The non-transitory computer readable storage medium of claim 17, wherein the stored processor-executable instructions are configured to cause the processor to perform operations further comprising:
 analyzing a behavior of the client computing device;
 generating a report based on results of analyzing the behavior; and
 sending the generated report to the server computing device.

\* \* \* \* \*